(12) United States Patent
Shimotsu

(10) Patent No.: US 7,899,289 B2
(45) Date of Patent: Mar. 1, 2011

(54) OPTICAL FIBER STRUCTURE

(75) Inventor: Shinichi Shimotsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 12/359,759

(22) Filed: Jan. 26, 2009

(65) Prior Publication Data

US 2009/0190886 A1 Jul. 30, 2009

(30) Foreign Application Priority Data

Jan. 25, 2008 (JP) ............................. 2008-014743

(51) Int. Cl.
*G02B 6/26* (2006.01)
(52) U.S. Cl. .................. 385/52; 385/31; 385/50; 385/51
(58) Field of Classification Search ............... 385/53, 385/59–60, 77–78, 83, 52
See application file for complete search history.

(56) References Cited

U.S. PATENT DOCUMENTS

| | | | | |
|---|---|---|---|---|
| 4,046,454 A * | 9/1977 | Pugh, III | ............... | 385/59 |
| 6,041,154 A * | 3/2000 | Ono et al. | ............... | 385/116 |
| 6,393,191 B1 * | 5/2002 | Chen et al. | ............... | 385/139 |
| 6,857,365 B2 | 2/2005 | Juffinger et al. | | |
| 6,859,581 B1 * | 2/2005 | Smith et al. | ............... | 385/26 |
| 2007/0165991 A1 * | 7/2007 | Huber | ............... | 385/125 |
| 2008/0279231 A1 * | 11/2008 | Farber et al. | ............... | 372/21 |

* cited by examiner

*Primary Examiner*—Mark A Robinson
*Assistant Examiner*—Michael P Mooney
(74) *Attorney, Agent, or Firm*—Sughrue Mion, PLLC

(57) ABSTRACT

An optical fiber structure includes a first fiber array and a second fiber array, which are placed one on the other. For example, the first fiber array includes a substrate having four V-shaped grooves and four first optical fibers, the output ends of which are linearly arranged and fixed to the substrate, and the second fiber array includes a substrate having four V-shaped grooves and four second optical fibers, the output ends of which are linearly arranged and fixed to the substrate. The first optical fiber is a multimode fiber having a core and a cladding, and the core diameter is 60 μm and the outer diameter of the fiber is 80 μm. The second optical fiber is a multimode fiber having a core and a cladding, and the core diameter is 105 μm and the outer diameter of the fiber is 125 μm.

10 Claims, 21 Drawing Sheets

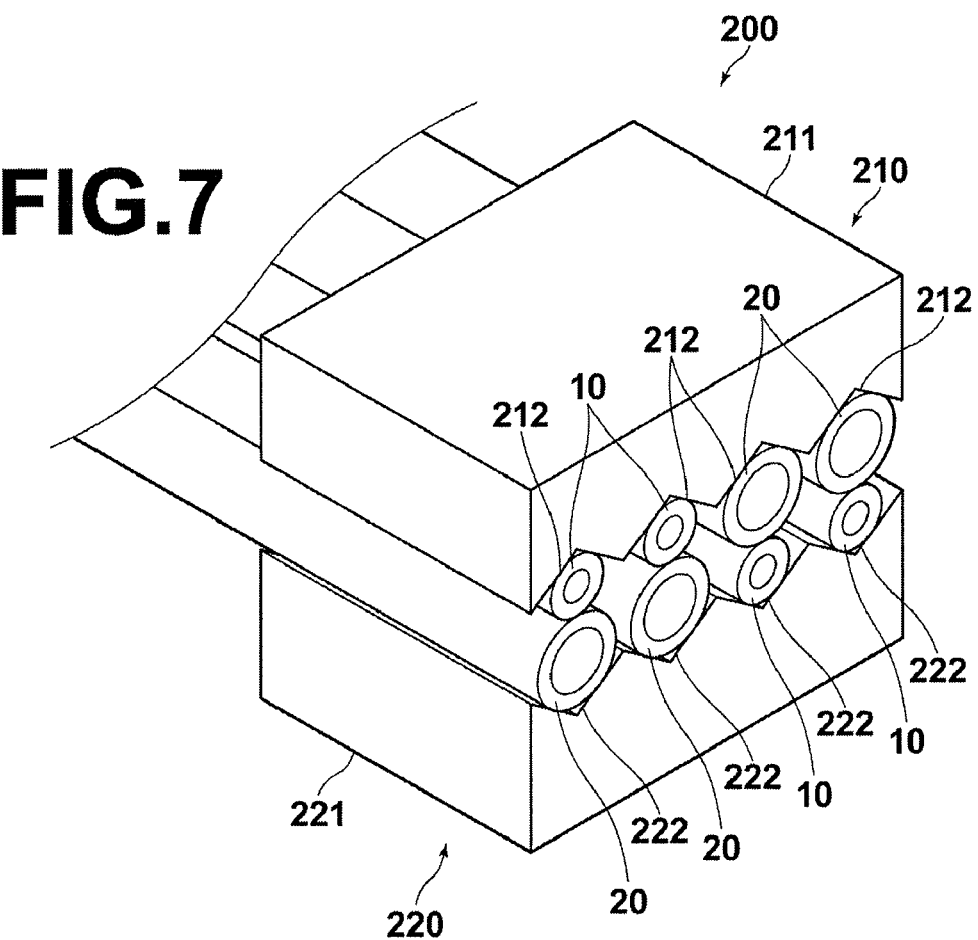
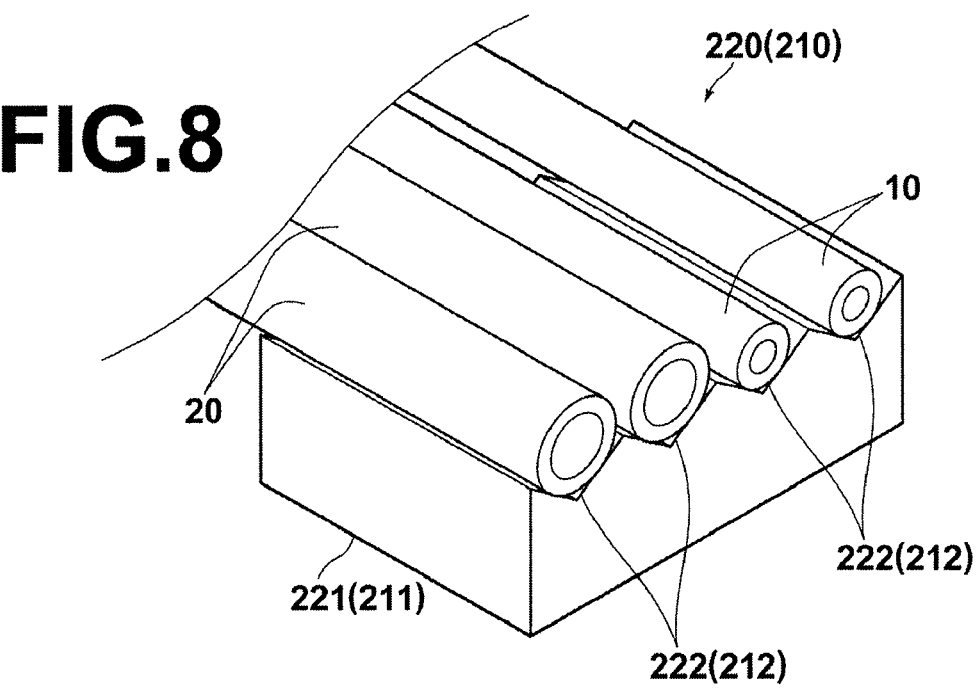

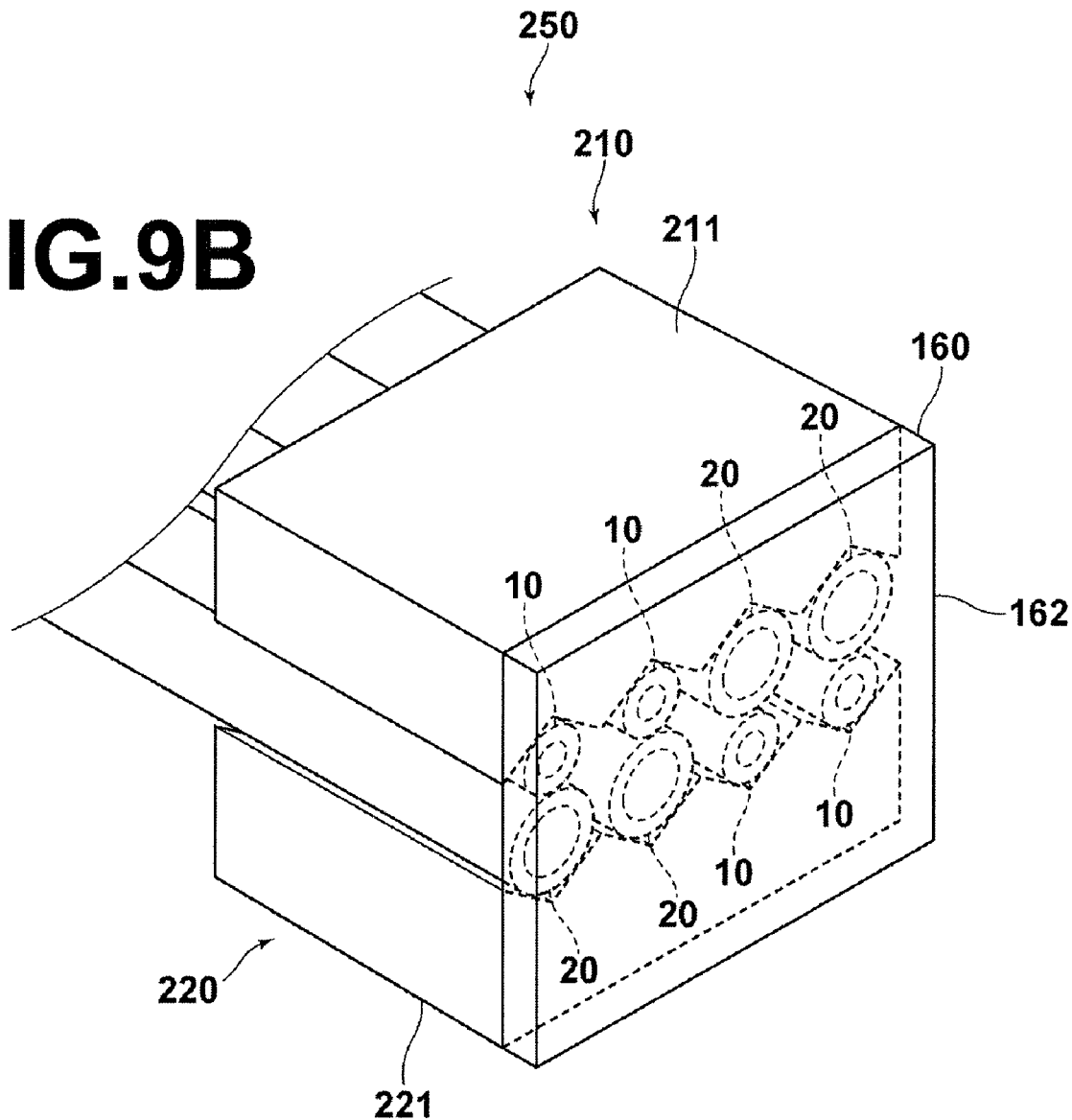

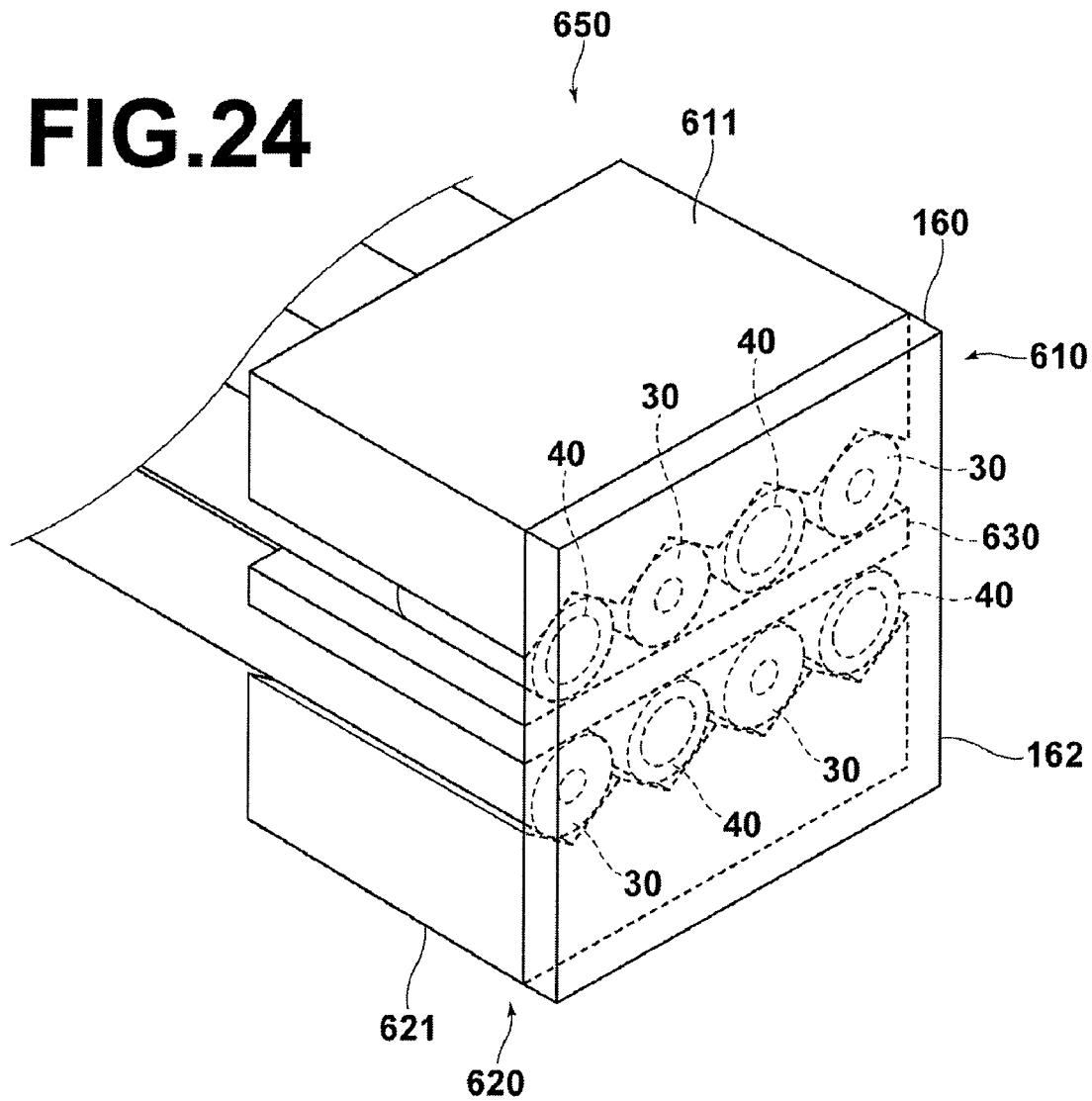

OPTICAL FIBER STRUCTURE

BACKGROUND OF THE INVENTION

1. Field of the Invention

The present invention relates to an optical fiber structure in which a plurality of optical fiber arrays, each including a plurality of multimode optical fibers, are placed one on another.

2. Description of the Related Art

Conventionally, laser light has been used in the fields of printing and processing. For example, in production of printing blocks as described in U.S. Pat. No. 6,857,365, the laser light is used to process materials to produce print blocks. In recent years, high-output semiconductor lasers have been developed. Further, optical fiber structures that transmit high-output laser light, which is output from the high-output semiconductor lasers, through fibers and output the transmitted light are known. Further, in the field of optical fiber structures that are used in processing as described above, multicore-type optical fiber structures in which a plurality of optical fibers are fixed in such a manner that one-side ends thereof are arranged in line form or in block form are being studied to be developed.

When the laser light is used to process the print blocks as described in U.S. Pat. No. 6,857,365, there are cases in which laser light that has a small beam diameter is desirable and cases in which laser light that has a large beam diameter is desirable, depending on processing conditions. For example, when a highly-precise process should be carried out, the laser light that has a small diameter is desirable. In contrast, when a so-called solid processing should be performed, in other words, when the entire area of a certain area should be processed uniformly, the laser light that has a large diameter is desirable. However, in the conventional multicore-type optical fiber structure, there is a problem that it is impossible to change the beam diameter based on the processing conditions, because the multicore-type optical fiber structure includes a plurality of same optical fibers, which output beams having the same beam diameter. Meanwhile, there is an apparatus that changes the beam diameter of laser light by a special optical system provided in a later stage. However, there is a problem that such an optical system tends to be complex.

SUMMARY OF THE INVENTION

In view of the foregoing circumstances, it is an object of the present invention to provide an optical fiber structure that has simple structure, but that can output light beams having different beam diameters from each other.

An optical fiber structure according to the present invention is an optical fiber structure comprising:

a first optical fiber array including a plurality of optical fibers, the output ends of which are linearly arranged; and a second optical fiber array including a plurality of optical fibers, the output ends of which are linearly arranged, wherein the first optical fiber array and the second optical fiber array are placed one on the other, and wherein the optical fibers in the first optical fiber array and the second optical fiber array include at least one first optical fiber that outputs a light beam having a first beam diameter from the output end thereof and at least one second optical fiber that outputs a light beam having a second beam diameter from the output end thereof, and wherein the first beam diameter and the second beam diameter are different from each other.

Here, the term "beam diameter" refers to the beam diameter of light that is output from the output end of each of optical fibers that constitute the optical fiber structure. The beam diameter is a beam diameter at the output end.

The expression "the optical fibers in the first optical fiber array and the second optical fiber array include at least one first optical fiber that outputs a light beam having a first beam diameter from the output end thereof" means that at least one of the optical fibers is the first optical fiber. Further, the expression "the optical fibers in the first optical fiber array and the second optical fiber array include . . . at least one second optical fiber that outputs a light beam having a second beam diameter from the output end thereof, and wherein the first beam diameter and the second beam diameter are different from each other" means that at least one of the optical fibers is a second optical fiber.

Further, when the first optical fiber array includes a plurality of first optical fibers arranged therein, the second optical fiber array may include a plurality of second optical fibers arranged therein.

Alternatively, each of the first optical fiber array and the second optical fiber array may include at least one first optical fiber and at least one second optical fiber arranged therein. Further, each of the first optical fibers and the second optical fibers may be arranged in such a manner that the arrangement in the second optical fiber array is in reverse order to the order of arrangement in the first optical fiber array.

The expression "the arrangement in the second optical fiber array is in reverse order to the order of arrangement in the first optical fiber array" means that when the second optical fiber array is placed upside down, the arrangement of the optical fibers in the second optical fiber becomes the same as the arrangement of the optical fibers in the first optical fiber array.

When the first optical fiber array includes the at least one first optical fiber arranged in a half of the first optical fiber array and the at least one second optical fiber arranged in the other half of the first optical fiber array, the second optical fiber array may include the at least one second optical fiber arranged in a half of the second optical fiber array and the at least one first optical fiber arranged in the other half of the second optical fiber array.

When the at least one first optical fiber and the at least one second optical fiber in the first optical fiber array are alternately arranged one by one, the at least one second optical fiber and the at least one first optical fiber in the second optical fiber array may be alternately arranged one by one.

Further, the first optical fiber arranged in the first optical fiber array and the second optical fiber arranged in the second optical fiber array may face each other, and the second optical fiber arranged in the first optical fiber array and the first optical fiber arranged in the second optical fiber array may face each other.

The expression "the first optical fiber arranged in the first optical fiber array and the second optical fiber arranged in the second optical fiber array face each other, and the second optical fiber arranged in the first optical fiber array and the first optical fiber arranged in the second optical fiber array face each other" means that the first optical fiber arranged in the first optical fiber array and the second optical fiber arranged in the second optical fiber array are linearly aligned in a direction that is substantially perpendicular to the arrangement direction (extending direction) of the optical fiber arrays and that the second optical fiber arranged in the first optical fiber array and the first optical fiber arranged in the second optical fiber array are linearly aligned in a direction that is substantially perpendicular to the arrangement direction of the optical fiber arrays. The first optical fibers and the second optical fibers may be in direct contact with each other. Alternatively, a pressure plate or the like may be inserted between the first optical fiber and the second optical fiber.

Further, the core diameter of the first optical fibers at the output ends thereof may be different from the core diameter of the second optical fibers at the output ends thereof.

Alternatively, the core diameter of the second optical fibers at the output ends thereof may be greater than the core diameter of the first optical fibers at the output ends thereof, and the second optical fibers may have light divergent points on the insides of the output ends of the second optical fibers.

Here, the expression "have light divergent points on the insides of the output ends" means that the second optical fibers have light divergent points on the insides of the light output ends of the second optical fibers, in other words, the light divergent points are located at positions on the light-input-end sides of the light output ends thereof. Further, the second optical fiber may be a plurality of optical fibers that are connected to each other. Alternatively, the second optical fiber may be a single optical fiber that has a light divergent point in the inside thereof.

Further, the second optical fiber may include a main optical fiber that has a core having a predetermined core diameter and a supplementary optical fiber that has a core having a core diameter that is greater than that of the main optical fiber. Further, the main optical fiber and the supplementary optical fiber may be connected to each other, and the light divergent point of the second optical fiber may be located at a connection point between the main optical fiber and the supplementary optical fiber.

The core diameter of the main optical fiber may be the same as the core diameter of the first optical fiber. Further, the angle of divergence of light output from the first optical fiber may be the same as the angle of divergence of light output from the second optical fiber.

In the optical fiber structure according to the present invention, a transparent member for protecting the end surfaces of the optical fibers may be attached to the surfaces of the output ends of the optical fibers by optical contact.

Further, an anti-reflection coating may be provided on the output side of the transparent member for protecting the end surfaces of the optical fibers.

Further, the power of light that is output from each of the optical fibers may be greater than or equal to 1 W.

The optical fiber structure according to the present invention is an optical fiber structure comprising:

a first optical fiber array including a plurality of optical fibers, the output ends of which are linearly arranged; and a second optical fiber array including a plurality of optical fibers, the output ends of which are linearly arranged, wherein the first optical fiber array and the second optical fiber array are placed one on the other, and wherein the optical fibers in the first optical fiber array and the second optical fiber array include at least one first optical fiber that outputs a light beam having a first beam diameter from the output end thereof and at least one second optical fiber that outputs a light beam having a second beam diameter from the output end thereof, and wherein the first beam diameter and the second beam diameter are different from each other. Therefore, it is not necessary to provide a complex optical system that was required in conventional apparatuses. In the present invention, a single optical fiber structure that has simple structure can output light beams that have different beam diameters from each other.

When the first optical fiber array includes a plurality of first optical fibers arranged therein and the second optical fiber array includes a plurality of second optical fibers arranged therein, if a user wants to use a light beam output from the first optical fiber, he/she can use the first optical fiber array. Alternatively, if the user wants to use a light beam output from the second optical fiber, he/she can use the second optical fiber array. Therefore, the convenience of the optical fiber structure is improved.

When each of the first optical fiber array and the second optical fiber array includes at least one first optical fiber and at least one second optical fiber arranged therein, and each of the first optical fibers and the second optical fibers is arranged in such a manner that the arrangement in the second optical fiber array is in reverse order to the order of arrangement in the first optical fiber array, two fiber arrays in which the optical fibers are arranged in the same manner may be produced. Then, one of the two fiber arrays may be placed in an ordinary direction, and the other fiber array may be placed upside down. Further, the two fiber arrays may be placed one on the other to produce the optical fiber structure. Hence, simple and low-cost production of the optical fiber structure becomes possible.

Further, when the first optical fiber array includes the at least one first optical fiber arranged in a half of the first optical fiber array and the at least one second optical fiber arranged in the other half of the first optical fiber array, and the second optical fiber array includes the at least one second optical fiber arranged in a half of the second optical fiber array and the at least one first optical fiber arranged in the other half of the second optical fiber array, if the outer diameter of the first optical fiber differs from that of the second optical fiber, the arrangement of high portions and low portions in the first fiber array and that of high portions and low portions in the second fiber array are opposite to each other, in other words, a high portion faces a low portion, and a low portion faces a high portion. Hence, there is an advantageous effect that the first fiber array and the second fiber array can be easily positioned with respect to each other when they are placed one on the other.

Further, when the at least one first optical fiber and the at least one second optical fiber in the first optical fiber array are alternately arranged one by one, and the at least one second optical fiber and the at least one first optical fiber in the second optical fiber array are alternately arranged one by one, if the outer diameter of the first optical fiber differs from that of the second optical fiber, the shape of the uneven surface (a projection and a depression) of the first fiber array and the shape of the uneven surface of the second fiber array are opposite to each other, in other words, a projection faces a depression, and a depression faces a projection. Hence, there is an advantageous effect that the first fiber array and the second fiber array can be more easily positioned with respect to each other when they are placed one on the other.

Further, when the first optical fiber arranged in the first optical fiber array and the second optical fiber arranged in the second optical fiber array face each other and the second optical fiber arranged in the first optical fiber array and the first optical fiber arranged in the second optical fiber array face each other, the first optical fiber and the second optical fiber can carry out processing with respect to the same pixel, for example, in print processing or the like. Hence, the usability and convenience of the optical fiber structure is improved.

Further, when the core diameter of the first optical fibers at the output ends thereof is different from the core diameter of the second optical fibers at the output ends thereof, ordinary optical fibers that have different core diameters from each other can be used. Hence, the optical fiber structure can be produced at low cost.

Further, when the core diameter of the second optical fibers at the output ends thereof is greater than the core diameter of the first optical fibers at the output ends thereof, and the second optical fibers have light divergent points on the insides of the output ends of the second optical fibers, it is possible to output light beams that have arbitrary beam diameters from the second optical fibers by adjusting the positions of the light divergent points of the second optical fibers.

When the second optical fiber includes a main optical fiber that has a core having a predetermined core diameter and a supplementary optical fiber that has a core having a core diameter that is greater than that of the main optical fiber, and the main optical fiber and the supplementary optical fiber are connected to each other, and the light divergent point of the second optical fiber is located at a connection point between the main optical fiber and the supplementary optical fiber, it is possible to output a light beam that has an arbitrary beam diameter from the second optical fiber by adjusting the length of the supplementary optical fiber.

Further, when the core diameter of the main optical fiber is the same as the core diameter of the first optical fiber, and the angle of divergence of light output from the first optical fiber is the same as the angle of divergence of light output from the second optical fiber, it is possible to simplify the structure of an optical system connected to the optical fiber structure. Further, it is possible to make the focal position of the light beam output from the first optical fiber and that of the light beam output from the second optical fiber different from each other by using the optical fiber structure that has simple structure.

BRIEF DESCRIPTION OF THE DRAWINGS

FIG. 7 is a schematic diagram illustrating the structure of an optical fiber structure according to a third embodiment of the present invention;

FIG. 8 is a schematic diagram illustrating the structure of an optical fiber array;

FIG. 9B is a schematic diagram illustrating the structure of an optical fiber structure according to a fourth embodiment of the present invention;

FIG. 24 is a schematic diagram illustrating the structure of an optical fiber structure according to a twelfth embodiment of the present invention.

DESCRIPTION OF THE PREFERRED EMBODIMENTS

Figure 1:
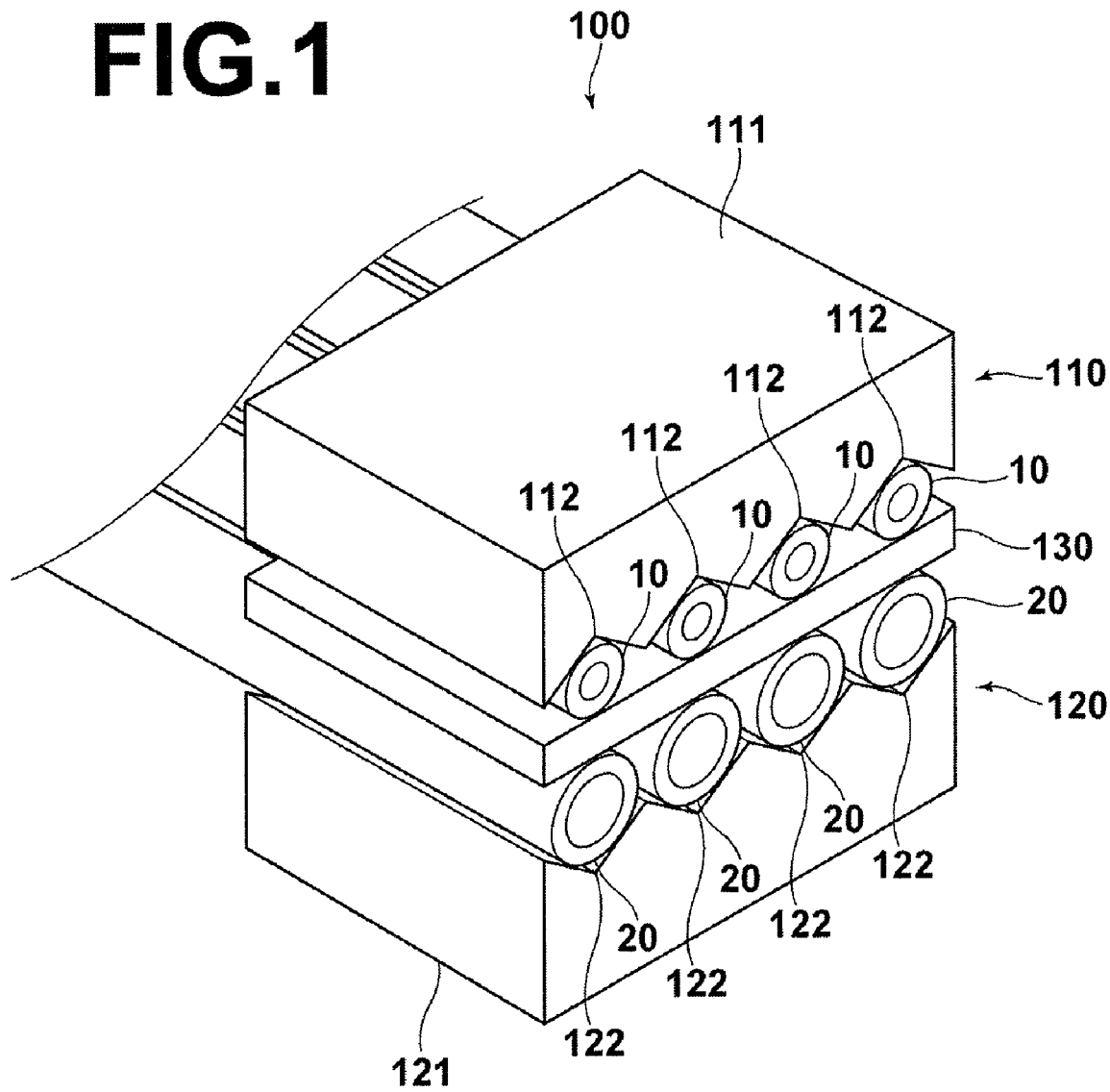
FIG. 1 is a schematic diagram illustrating the structure of an optical fiber structure according to a first embodiment of the present invention.

An optical fiber structure according to a first embodiment of the present invention will be described with reference to the attached drawings. FIG. 1 is a schematic diagram illustrating the structure of an optical fiber structure 100.

As illustrated in FIG. 1, the optical fiber structure 100 includes a first fiber array (first optical fiber array) 110, a second fiber array (second optical fiber array) 120 and a pressure plate 130. The first fiber array 110 includes a substrate 111 having four V-shaped grooves 112 and four optical fibers 10, the ends of which are fixed onto the substrate ill having the four V-shaped grooves. The second fiber array 120 includes a substrate 121 having four V-shaped grooves 122 and four optical fibers 20, the ends of which are fixed onto the substrate 121 having the four V-shaped grooves. The first fiber array 110 and the second fiber array 120 are placed one on the other with the pressure plate 130 therebetween in such a manner that the optical fibers 10 and the optical fibers 20 face each other, and the positions of the first fiber array 110 and the second fiber array 120 are fixed.

Figure 2:
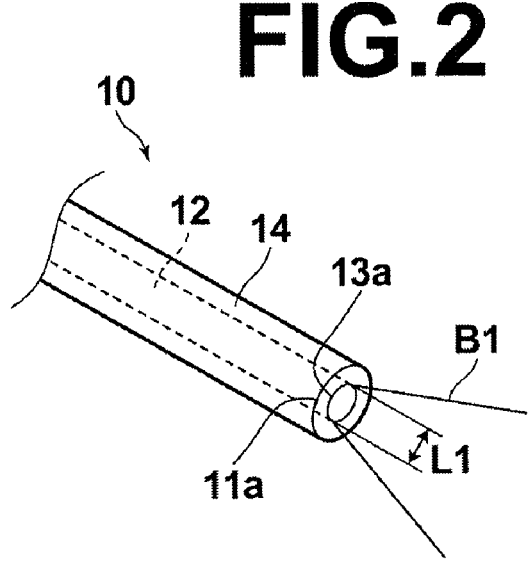
FIG. 2 is a schematic diagram illustrating the structure of an optical fiber.
Figure 3:
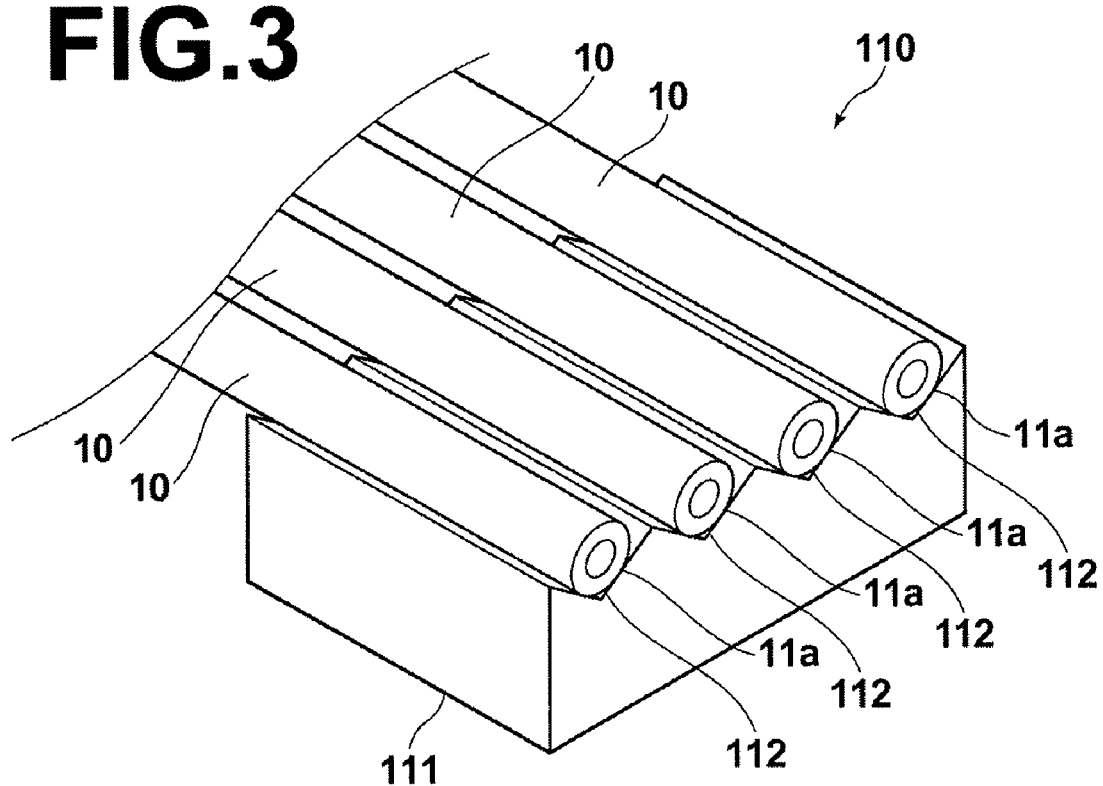
FIG. 3 is a schematic diagram illustrating the structure of an optical fiber array.

As illustrated in FIG. 2, the optical fiber 10 is a multimode fiber having a core 12 and a cladding (a clad or a cladding layer) 14. The diameter of the core 12 is 60 µm, and the outer diameter of the fiber is 80 µm. Further, a polished end surface 13a of the core 12 is exposed at the output end 11a of the optical fiber 10. When light beam B1, which has propagated through the optical fiber 10, is output from the output end 11a of the optical fiber 10, the beam diameter L1 of the light beam B1 is the same as the core diameter, which is 60 µm. As illustrated in FIG. 3, the output ends 11a of four optical fibers 10 are fixed into the V-shaped grooves 112 in the substrate 111 having the V-shaped grooves 112, respectively, in such a manner that the output ends 11a of the optical fibers 10 are linearly arranged at the ends of the V-shaped grooves 112 of the substrate 111 having the V-shaped grooves 112. The optical fibers 10 are fixed into the V-shaped grooves 112 with an ultraviolet-setting resin (a UV-setting resin, a UV-curable resin or an ultraviolet-curable resin), a thermosetting adhesive resin (a thermosetting resin or a thermally curable resin) or the like.

Figure 4:
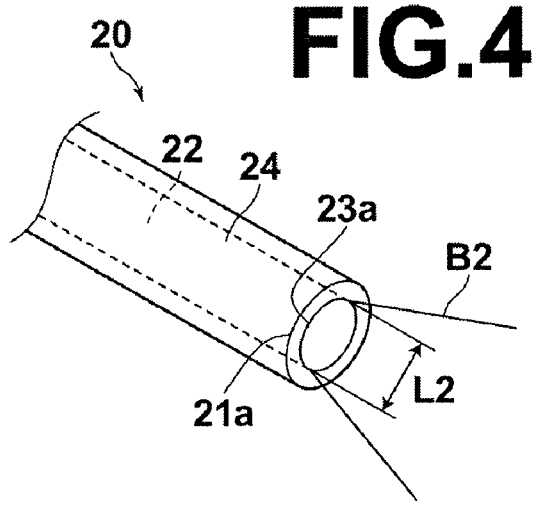
FIG. 4 is a schematic diagram illustrating the structure of an optical fiber.
Figure 5:
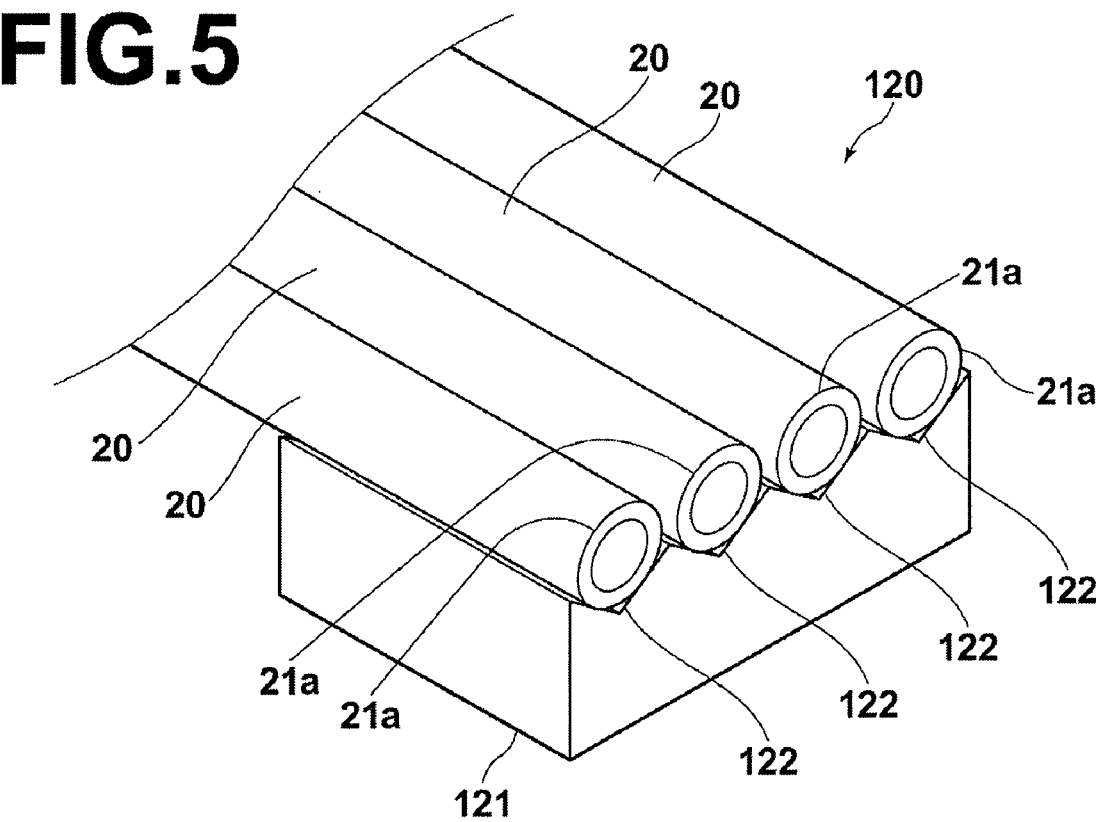
FIG. 5 is a schematic diagram illustrating the structure of an optical fiber array.

As illustrated in FIG. 4, the optical fiber 20 is a multimode fiber having a core 22 and a cladding (a clad or a cladding layer) 24. The diameter of the core 22 is 105 µm, and the outer diameter of the fiber is 125 µm. Further, a polished end surface 23a of the core is exposed at the output end 21a of the optical fiber 20. When light beam B2, which has propagated through the optical fiber 20, is output from the output end 21a of the optical fiber 20, the beam diameter L2 of the light beam B2 is the same as the core diameter, which is 105 µm. As illustrated in FIG. 5, the output ends 21a of the four optical fibers 20 are fixed into the V-shaped grooves 122 in the substrate 121 having the V-shaped grooves 122, respectively, in such a manner that the output ends 21a of the optical fibers 20 are linearly arranged at the ends of the V-shaped grooves 122 of the substrate 121 having the V-shaped grooves 122. The optical fibers 20 are fixed into the V-shaped grooves 122 with an ultraviolet-setting resin, a thermosetting adhesive resin or the like.

The optical fiber structure 100 may be used, for example, as an optical head for processing print block plates (or to engrave print patterns on plates) or the like with laser light. In such a case, a high-output semiconductor laser having output power of 10 W or the like, which is not illustrated, is connected to the input end of each of the optical fibers 10 and the optical fibers 20, the input end being opposite to the output end thereof. Further, an optical system (not illustrated) for condensing the light beam output from the optical fiber structure 100 onto the plate for printing is arranged between the optical fiber structure 100 and the plate for printing. It is possible to process the plate for printing by outputting laser light from a high-output semiconductor laser that is connected to a desirable optical fiber, which a user wants to use for the processing, while shifting the optical fiber structure 100 and the plate for printing relative to each other in the vertical direction of FIG. 1.

As described above, the beam diameter L1 of the light beam B1 at the output end 11a of the optical fiber 10 is the same as the core diameter of the optical fiber 10, which is 60 µm. Further, the beam diameter L2 of the light beam B2 at the output end 21a of the optical fiber 20 is the same as the core diameter of the optical fiber 20, which is 105 µm. The optical fiber structure 100, which has simple structure, can output light beams that have different beam diameters. For example, when it is desirable to use a light beam that has a small diameter to carry out highly precise processing or the like, the light beam output from the optical fiber 10 is used. In contrast, when it is desirable to use a light beam that has a large diameter to carry out a so-called solid process (processing the entire area of a certain portion uniformly so that no unprocessed area substantially remains after the processing) or the like, the light beam output from the optical fiber 20 is used.

Further, since the optical fibers 10 and the optical fibers 20 are arranged so as to face each other, it is possible to output light beams that have different beam diameters from each other for the same single pixel, for example, in print processing or the like. Hence, the optical fiber structure 100 is used even more usefully.

Figure 6A:
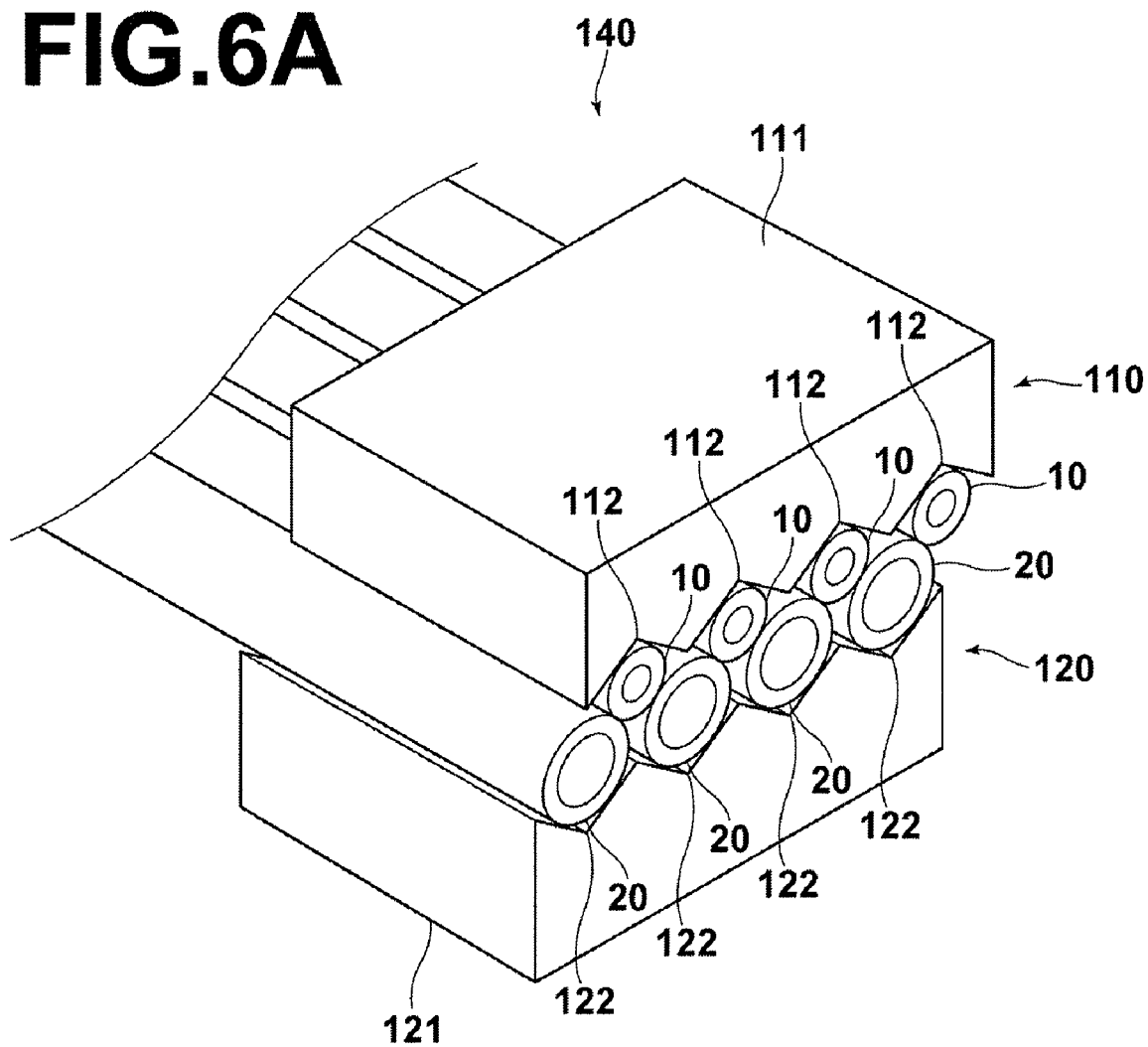
FIG. 6A is a schematic diagram illustrating the structure of another optical fiber structure.

FIG. 6A illustrates an optical fiber structure 140, which is a modified example of the present embodiment. When it is not necessary that the optical fibers 10 and the optical fibers 20 are aligned in a direction perpendicular to the arrangement direction of each of the optical fiber arrays, the optical fibers 10 and the optical fibers 20 may be arranged as in the optical fiber structure 140. In the optical fiber structure 140, the optical fibers 10 and the optical fibers 20 are arranged as closely as possible, thereby reducing the size of the optical fiber structure.

Figure 6B:
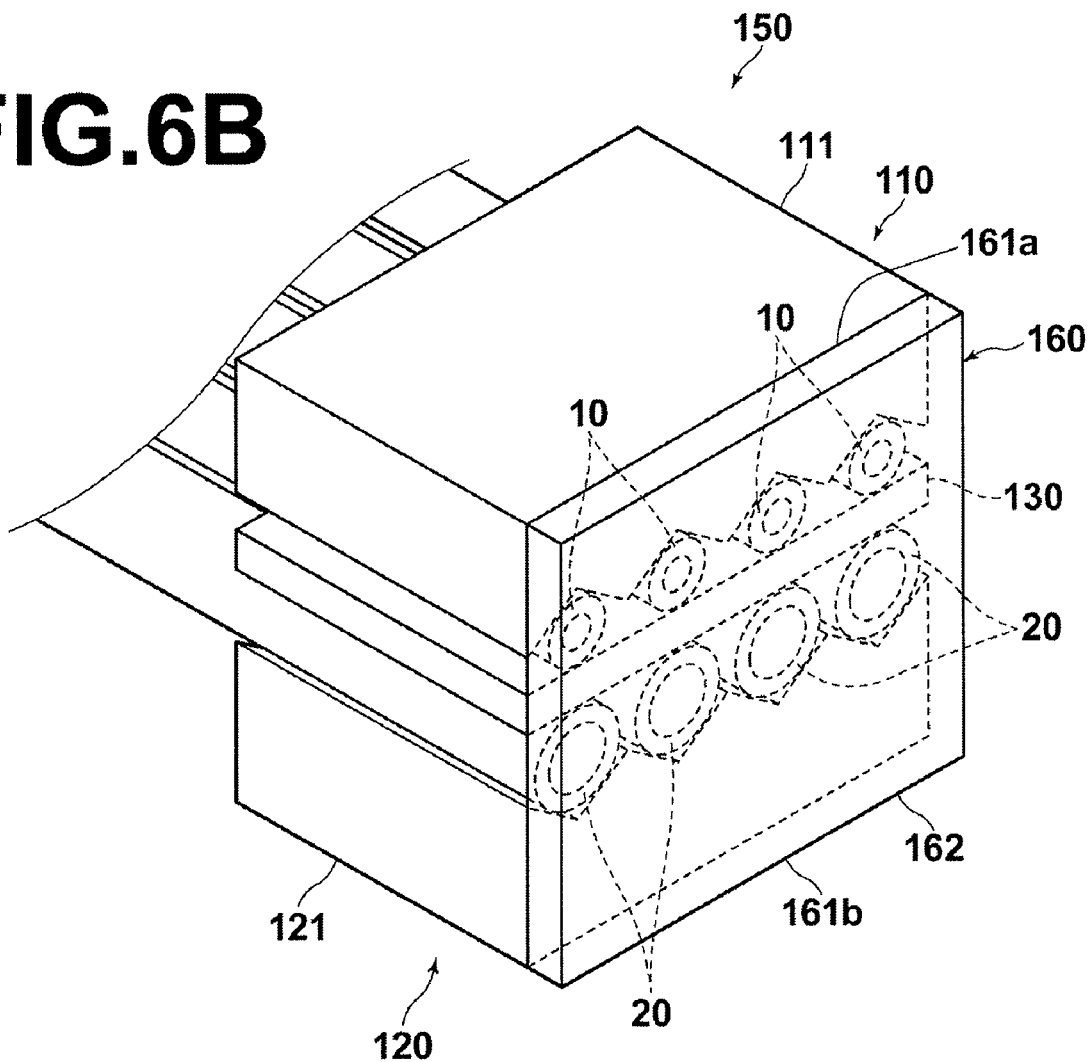
FIG. 6B is a schematic diagram illustrating the structure of an optical fiber structure according to a second embodiment of the present invention.

Next, an optical fiber structure according to a second embodiment of the present invention will be described. FIG. 6B is a schematic diagram illustrating the structure of an optical fiber structure 150. The structure of the optical fiber structure 150 is similar to that of the optical fiber structure 100, illustrated in FIG. 1, except that a transparent member 160 for protecting the end surface is provided at the output end surface in the optical fiber structure 150. Therefore, the same reference numerals will be assigned to corresponding parts and elements, and the explanation thereof will be omitted.

As illustrated in FIG. 6B, the optical fiber structure 150 includes the first fiber array 110, the second fiber array 120, the pressure plate 130 and the transparent member 160 for protecting the end surface. The first fiber array 110 includes a substrate 111 having V-shaped grooves and the four optical fibers 10, the ends of which are fixed onto the substrate 111. The second fiber array 120 includes the substrate 121 having V-shaped grooves and the four optical fibers 20, the ends of which are fixed onto the substrate 121. The transparent member 160 for protecting the end surface is attached to the output end 11a of each of the optical fibers 10 and the output end 21a of each of the optical fibers 20 by optical contact.

The transparent member 160 is a rectangular plate made of quartz, and a surface 161b of the transparent member 160 is coated with an anti-reflection coating 162. The surface 161b is opposite to a surface 161a of the transparent member 160, the surface 161a being in contact with the output ends of the optical fibers.

As described above, the transparent member 160 for protecting the end surfaces is attached to the output end of each of the optical fibers by optical contact. Therefore, the light beam that has been output from the output end of each of the optical fibers is transmitted through the transparent member 160, and output to the outside of the transparent member 160 from the surface 161b of the transparent member 160. Since the output end of each of the optical fibers is covered with the transparent member, it is possible to prevent the output ends of the optical fibers from being damaged by burning due to adhesion of dust or the like thereto.

Further, when the light beam passes through the transparent member 160, the diameter of the light beam increases. Therefore, the density of the light beam at the output position from the optical fiber structure 150 to air, which is the surface 161b in this embodiment, is lower than the density of the light beam output from the optical fiber structure in which the transparent member 160 is not provided. Therefore, the transparent member 160 can prevent burning at the surface 161b of the transparent member 160. Further, the transparent member 160 can prevent the anti-reflection coating 162 that has been applied to the surface 161b of the transparent member 160 from being damaged. Further, the transparent member 160 can reduce light that returns from the output surface of the light beam. Therefore, it is possible to prevent the lasers connected to the input ends of the optical fibers from being damaged.

Further, the optical fiber structure 140, illustrated in FIG. 6A, may be modified in such a manner that a transparent member 160 is provided at the output ends of the optical fibers, which output light beams.

Next, an optical fiber structure according to a third embodiment of the present invention will be described. FIG. 7 is a schematic diagram illustrating the structure of an optical fiber structure 200. In FIG. 7, the same reference numerals will be assigned to parts and elements corresponding to those of the optical fiber structure 100, illustrated in FIG. 1, and the explanation thereof will be omitted.

As illustrated in FIG. 7, the optical fiber structure 200 includes a first fiber array 210 and a second fiber array 220. The first fiber array 210 includes a substrate 211 having four V-shaped grooves 212, two optical fibers 10 and two optical fibers 20, the ends of the two optical fibers 10 and the two optical fibers 20 being fixed onto the substrate 211 having the V-shaped grooves. The second fiber array 220 includes a substrate 221 having four V-shaped grooves 222, two optical fibers 10 and two optical fibers 20, the ends of the two optical fibers 10 and the two optical fibers 20 being fixed onto the substrate 221. The first fiber array 210 and the second fiber array 220 are placed one on the other in such a manner that the optical fibers 10 and the optical fibers 20 face each other, and fixed. In the first fiber array 210, the two optical fibers 10 are arranged from the left side of the first fiber array 210 illustrated in FIG. 7. Further, the two optical fibers 20 are arranged on the right side of the optical fibers 10. Meanwhile, in the second fiber array 220, the two optical fibers 20 are arranged from the left side of the second fiber array 220 illustrated in FIG. 7. Further, the two optical fibers 10 are arranged on the right side of the optical fibers 20. Specifically, the arrangement of the optical fibers in the first fiber array 210 and that of the optical fibers in the second fiber array 220 are opposite to each other (in other words, in reveres order).

In the second fiber array 220, two optical fibers 10 and two optical fibers 20 are arranged as illustrated in FIG. 8. The two optical fibers 10 and the two optical fibers 20 are fixed into V-shaped grooves 222 of the substrate 221 having the V-shaped grooves, respectively, using an ultraviolet setting resin, a thermosetting resin or the like. The two optical fibers 10 and the two optical fibers 20 are fixed in such a manner that the output ends of the two optical fibers 10 and the two optical fibers 20 are linearly arranged at the ends of the V-shaped grooves 222 of the substrate 221 having the V-shaped grooves.

Further, FIG. 8 may be viewed as a diagram in which the first fiber array 210, illustrated in FIG. 7, is placed upside down. In FIG. 8, two optical fibers 10 and two optical fibers 20 are fixed into the V-shaped grooves 212 of the substrate 211 having the V-shaped grooves, respectively, using an ultraviolet setting resin, a thermosetting resin or the like. The two optical fibers 10 and the two optical fibers 20 are fixed in such a manner that the output ends of the two optical fibers 10 and the two optical fibers 20 are linearly arranged at the ends of the V-shaped grooves 212 of the substrate 211 having the V-shaped grooves. Specifically, the structure of the first fiber array 210 and that of the second fiber array 220 are the same.

The optical fiber structure 200 may be used, for example, as an optical head for processing plates for printing with a laser beam in a manner similar to the optical fiber structure 100. The optical fiber structure 200 has advantageous effects similar to those of the optical fiber structure 100. Further, the optical fiber structure 200 can be obtained by producing two fiber arrays that have the same structure and by placing the two fiber arrays one on the other. Therefore, the optical fiber structure 200 can be produced easily and at low cost. Further, the outer diameter of the optical fiber 10 and that of the optical fiber 20 are different from each other. Therefore, the heights of the optical fibers 10 and the optical fibers 20 in the first fiber array 210, the heights at positions opposite to the substrate 211 having the V-shaped grooves, and the heights of the optical fibers 10 and the optical fibers 20 in the second fiber array 220, the heights at positions opposite to the substrate 221 having the V-shaped grooves, are opposite to each other. In other words, the heights of the optical fibers facing each other are opposite to each other (when the height of an optical fiber is high, the optical fiber facing the optical fiber is low, and vice versa). Therefore, when the first fiber array 210 and the second fiber array 220 are placed one on the other, positioning can be performed easily.

Figure 9A:
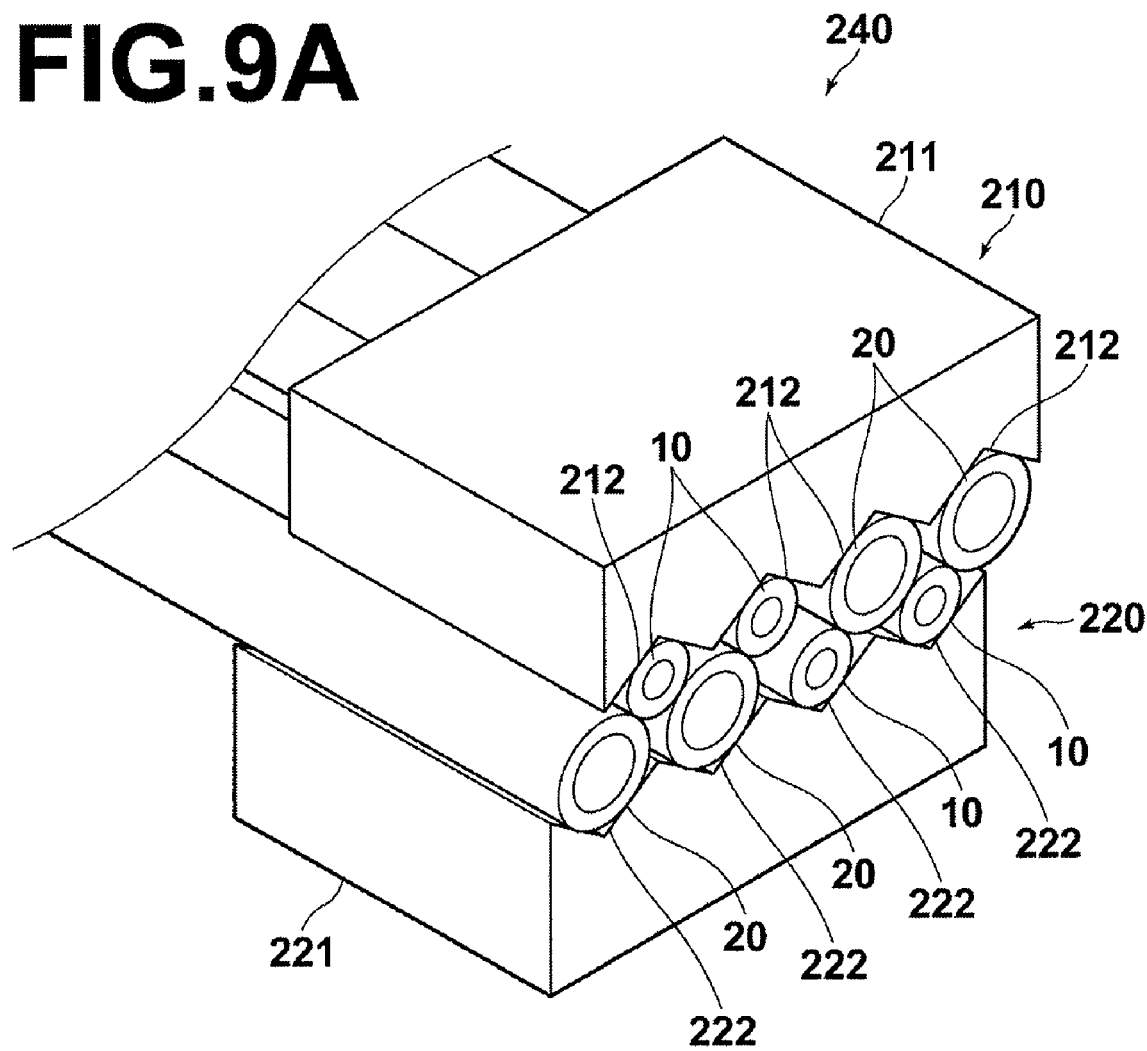
FIG. 9A is a schematic diagram illustrating the structure of another optical fiber structure.

An optical fiber structure 240, which is a modified example of the present embodiment, is illustrated in FIG. 9A. When it is not necessary that the optical fibers 10 and the optical fibers 20 are aligned in a direction perpendicular to the arrangement direction of each of the optical fiber arrays, the optical fibers 10 and the optical fibers 20 may be placed as arranged in the optical fiber structure 240. In the optical fiber structure 240, the optical fibers 10 and the optical fibers 20 are arranged as closely as possible, thereby reducing the size of the optical fiber structure.

Next, an optical fiber structure 250 according to a fourth embodiment of the present invention will be described with reference to FIG. 9B. FIG. 9B is a schematic diagram illustrating the structure of the optical fiber structure 250. In the optical fiber structure 250, the output end of the optical fiber structure 200, illustrated in FIG. 7, is placed in optical contact with the transparent member 160 for protecting the end, illustrated in FIG. 6B. The action and the advantageous effect of the transparent member 160 are substantially similar to those of the transparent member 160 in the optical fiber structure 150 illustrated in FIG. 6B. Therefore, detailed description on the transparent member 160 will be omitted.

Figure 10:
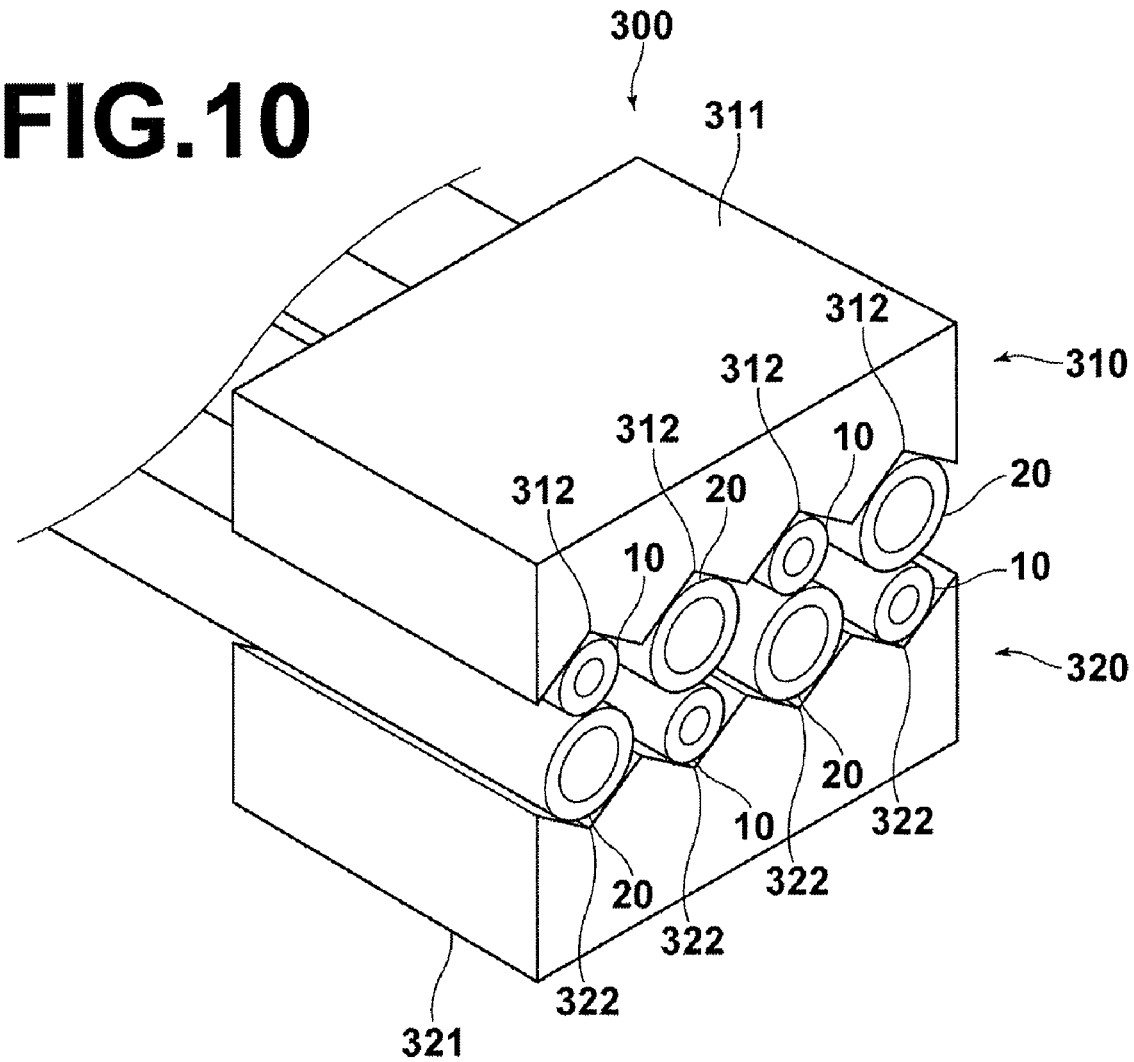
FIG. 10 is a schematic diagram illustrating the structure of an optical fiber structure according to a fifth embodiment of the present invention.

Next, an optical fiber structure according to a fifth embodiment of the present invention will be described. FIG. 10 is a schematic diagram illustrating the structure of an optical fiber structure 300. In FIG. 10, the same reference numerals as those assigned to the corresponding elements in the optical fiber structure 100, illustrated in FIG. 1, will be assigned to the parts and elements of the optical fiber structure 300, and detailed descriptions thereof will be omitted.

As illustrated in FIG. 10, the optical fiber structure 300 includes a first fiber array 310 and a second fiber array 320. The first fiber array 310 includes a substrate 311 having four V-shaped grooves 312, two optical fibers 10 and two optical fibers 20. The two optical fibers 10 and the two optical fibers 20 are alternately arranged, and the output ends thereof are fixed to the substrate 311 having the V-shaped grooves. The second fiber array 320 includes a substrate 321 having four V-shaped grooves, two optical fibers 10 and two optical fibers 20. The two optical fibers 10 and the two optical fibers 20 are alternately arranged, and the output ends thereof are fixed onto the substrate 321 having the V-shaped grooves. Further, the first fiber array 310 and the second fiber array 320 are placed one on the other in such a manner that the optical fibers 10 and the optical fibers 20 face each other, and fixed. In other words, the optical fiber 10 in the first fiber array 310 faces the optical fiber 20 in the second fiber array 320, and the optical fiber 20 in the first fiber array 310 faces the optical fiber 10 in the second fiber array 320. In the first fiber array 310, the order of arrangement of the optical fibers is the optical fiber 10, the optical fiber 20, the optical fiber 10, and the optical fiber 20 from the left side of FIG. 10. Meanwhile, in the second fiber array 320, the order of arrangement of the optical fibers is the optical fiber 20, the optical fiber 10, the optical fiber 20, and the optical fiber 10 from the left side of FIG. 10. In other words, the optical fibers in the first fiber array 310 are arranged in reverse order to the order of arrangement of the optical fibers in the second fiber array 320.

Figure 11:
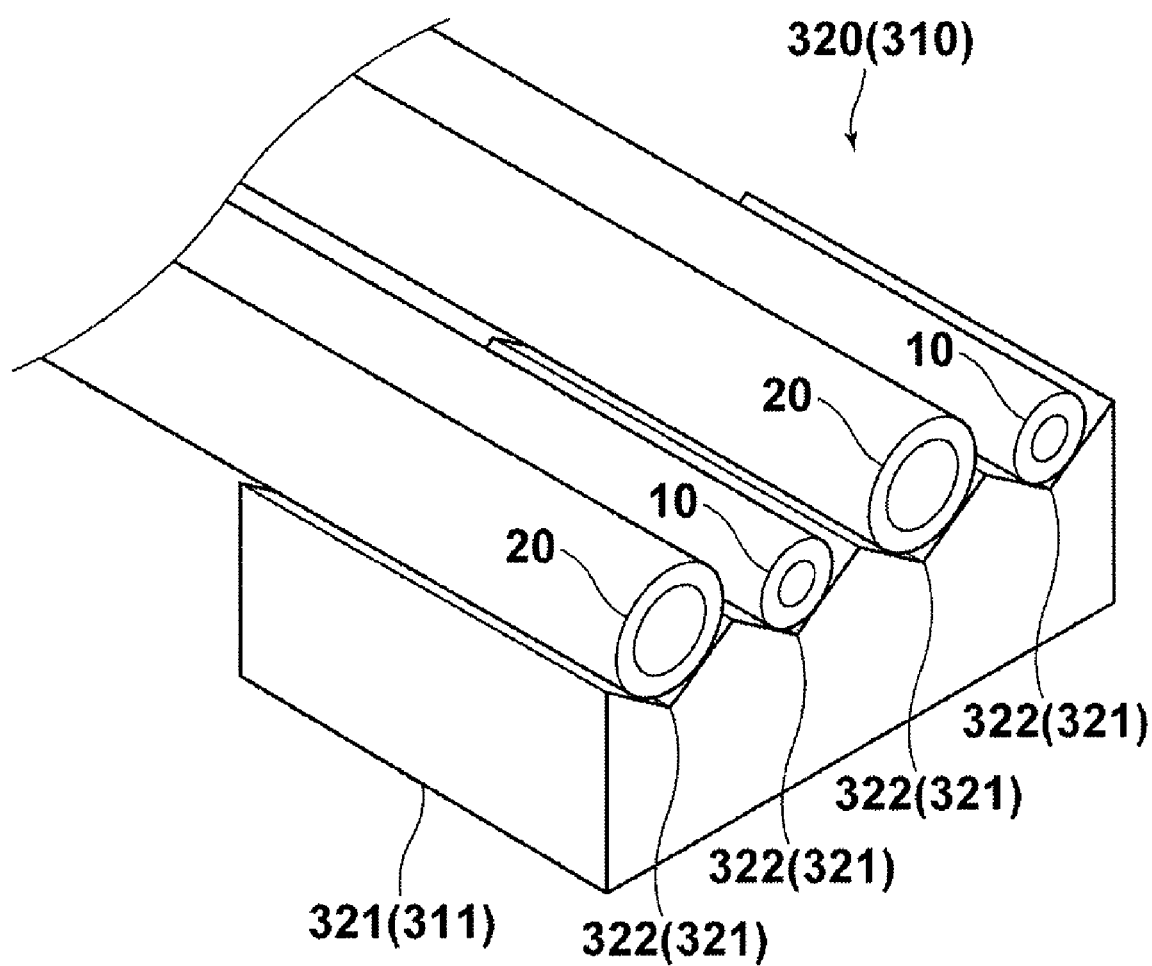
FIG. 11 is a schematic diagram illustrating the structure of an optical fiber array.

As illustrated in FIG. 11, in the second fiber array 320, the two optical fibers 10 and the two optical fibers 20 are fixed in such a manner that the output ends of the two optical fibers 10 and the two optical fibers 20 are linearly arranged at the ends of the V-shaped grooves 322 of the substrate 321 having the V-shaped grooves. The optical fibers are fixed into the V-shaped grooves 322, respectively, using an ultraviolet setting resin, a thermosetting resin or the like.

Further, FIG. 11 may be viewed as a diagram in which the first fiber array 310, illustrated in FIG. 10, is placed upside down. In FIG. 11, the two optical fibers 10 and the two optical fibers 20 are fixed into the V-shaped grooves 312 of the substrate 311 having the V-shaped grooves, respectively, using an ultraviolet setting resin, a thermosetting resin or the like. The two optical fibers 10 and the two optical fibers 20 are fixed in such a manner that the output ends of the two optical fibers 10 and the two optical fibers 20 are linearly arranged at the ends of the V-shaped grooves 312 of the substrate 311 having the V-shaped grooves. Specifically, the structure of the first fiber array 310 and that of the second fiber array 320 are the same.

The optical fiber structure 300 may be used, for example, as an optical head for processing plates for printing with a laser beam in a manner similar to the optical fiber structure 100. The optical fiber structure 300 has advantageous effects similar to those of the optical fiber structure 100. Further, the optical fiber structure 300 can be obtained by producing two fiber arrays that have the same structure and by placing the two fiber arrays one on the other. Therefore, the optical fiber structure 300 can be produced easily. Further, the outer diameter of the optical fiber 10 and that of the optical fiber 20 are different from each other. Therefore, the projections/depressions of the first fiber array 310, the projections/depressions positioned opposite to the substrate 311 having the V-shaped grooves, and the projections/depressions of the second fiber array 320, the projections/depressions positioned opposite to the substrate 321 having the V-shaped grooves, are opposite to each other (a projection faces a depression, and vice versa). Therefore, when the first fiber array 310 and the second fiber array 320 are placed one on the other, positioning can be performed easily. Further, for example, when so-called solid processing is performed, in other words, when the entire area of a certain portion is processed uniformly using a multiplicity of light beams having large diameters, since a contact area between the optical fibers is small, it is possible to prevent the ends of the optical fibers from being damaged by heat.

In the above example, the optical fibers are alternately arranged one by one. Alternatively, when a large number of optical fibers should be arranged, the optical fibers may be alternately arranged two by two (in twos), or three by three (in threes).

Figure 12:
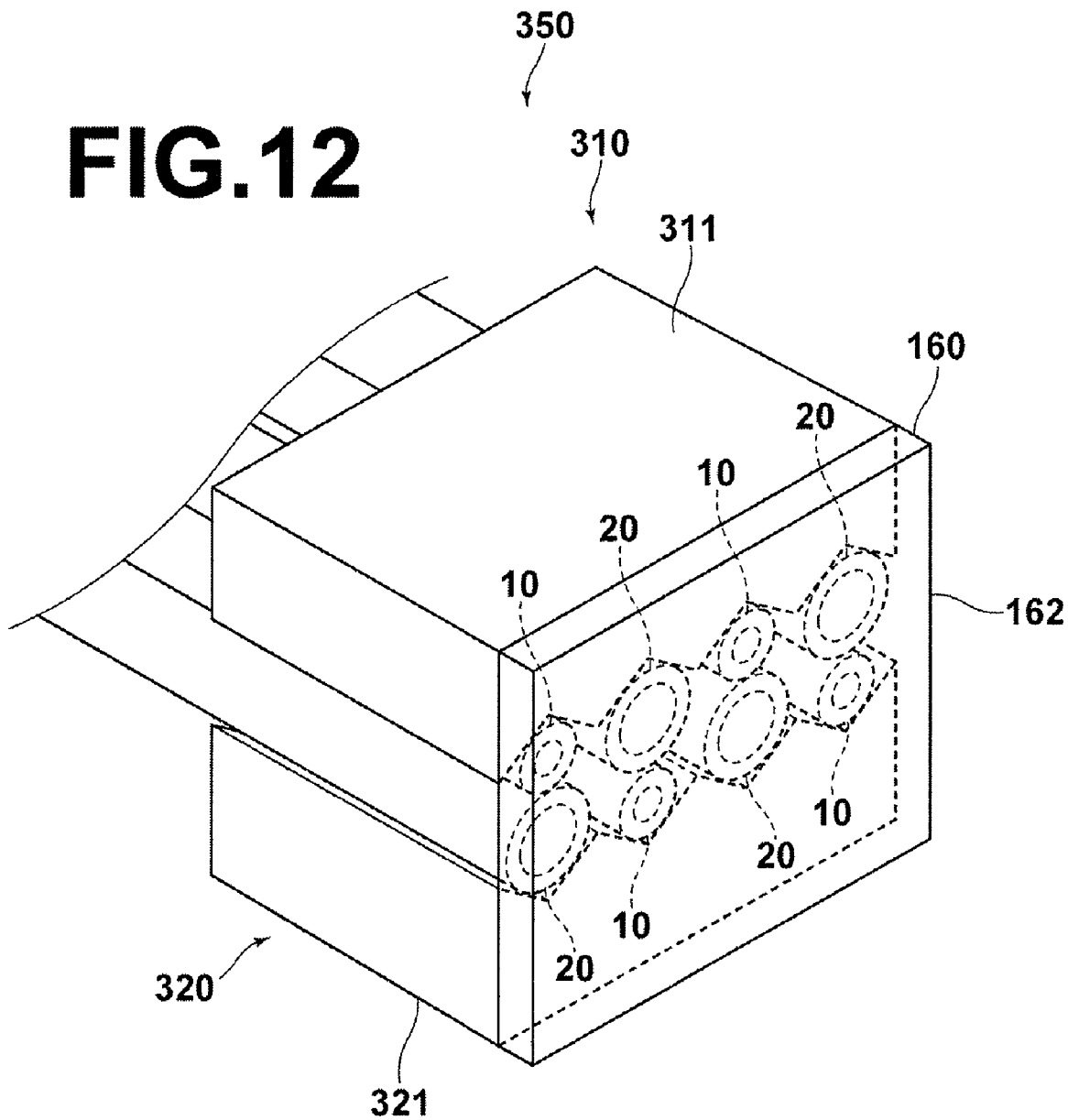
FIG. 12 is a schematic diagram illustrating the structure of an optical fiber structure according to a sixth embodiment of the present invention.

Next, an optical fiber structure 350 according to a sixth embodiment of the present invention will be described with reference to FIG. 12. FIG. 12 is a schematic diagram illustrating the structure of the optical fiber structure 350. In the optical fiber structure 350, the output end of the optical fiber structure 300, illustrated in FIG. 10, is placed in optical contact with the transparent member 160 for protecting the end, illustrated in FIG. 6B. The action and the advantageous effect of the transparent member 160 are substantially similar to those of the transparent member 160 in the optical fiber structure 150 illustrated in FIG. 6B. Therefore, detailed description on the transparent member 160 will be omitted.

Figure 13:
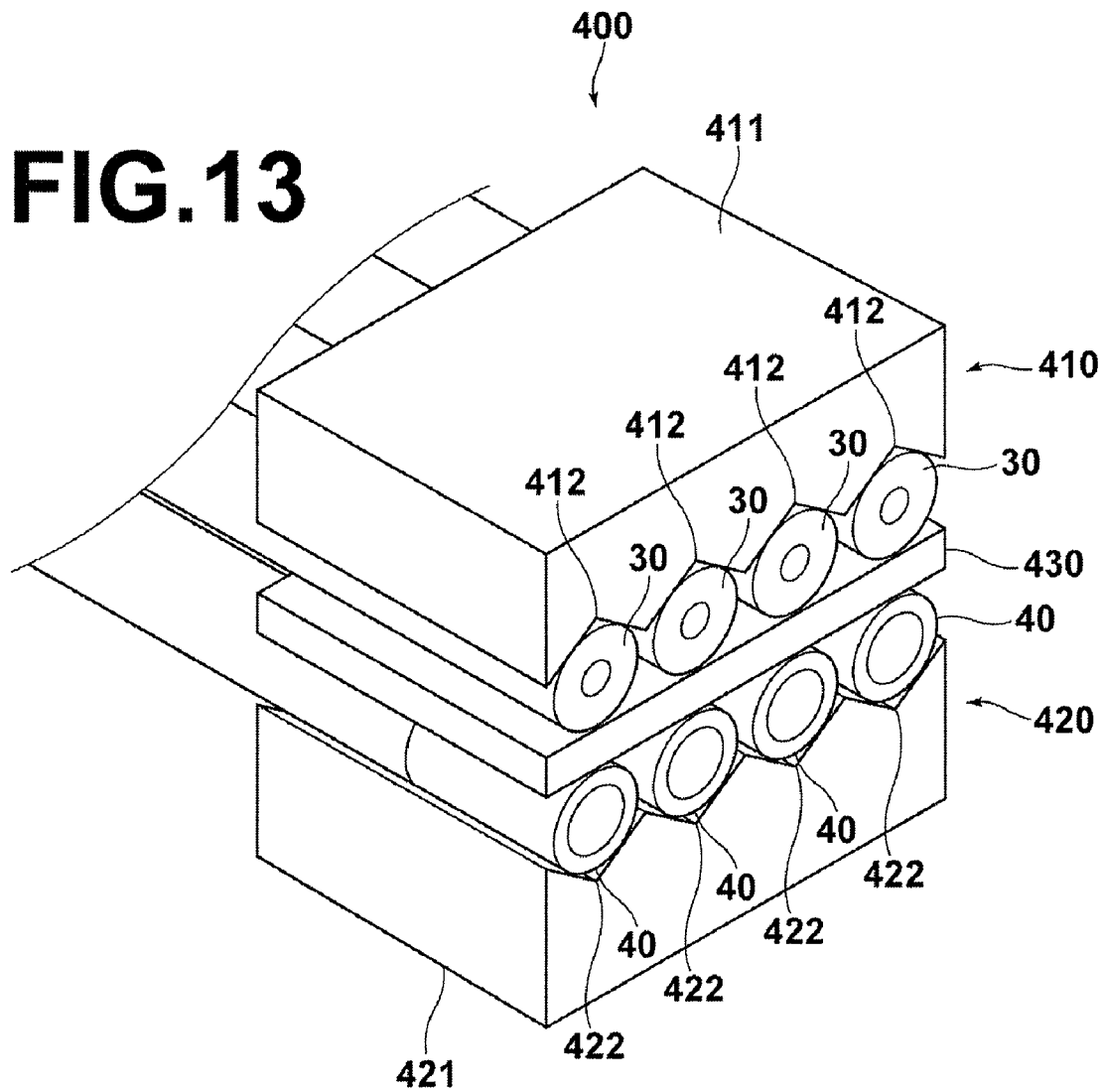
FIG. 13 is a schematic diagram illustrating the structure of an optical fiber structure according to a seventh embodiment of the present invention.

Next, an optical fiber structure according to a seventh embodiment of the present invention will be described. FIG. 13 is a schematic diagram illustrating the structure of an optical fiber structure 400.

As illustrated in FIG. 13, the optical fiber structure 400 includes a first fiber array 410, a second fiber array 420 and a pressure plate 430. The first fiber array 410 includes a substrate 411 having four V-shaped grooves 412 and four optical fibers 30. The ends of the four optical fibers 30 are fixed onto the substrate 411 having the V-shaped grooves. The second fiber array 420 includes a substrate 421 having four V-shaped grooves 422 and four optical fibers 40, the ends of which are fixed onto the substrate 421 having the V-shaped grooves. Further, the first fiber array 410 and the second fiber array 420 are placed one on the other with the pressure plate 430 therebetween in such a manner that the optical fibers 30 and the optical fibers 40 face each other.

Figure 14:
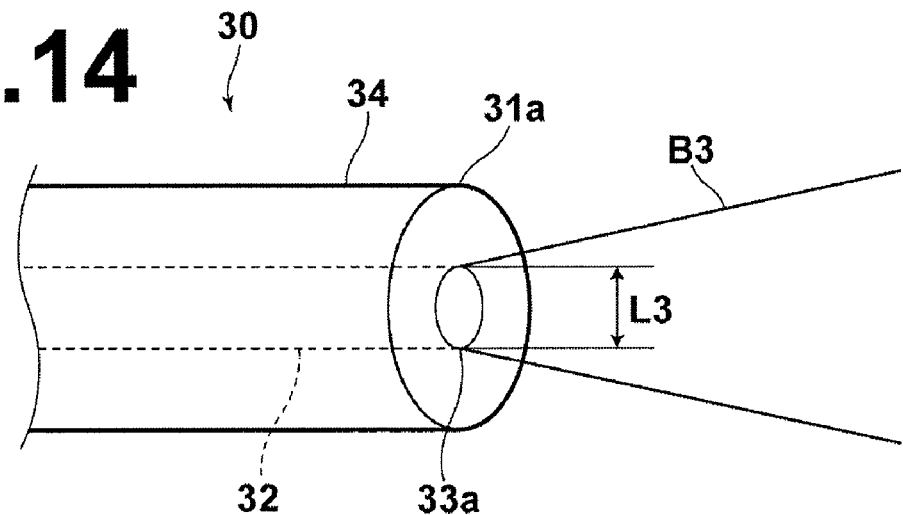
FIG. 14 is a schematic diagram illustrating the structure of an optical fiber.
Figure 15:
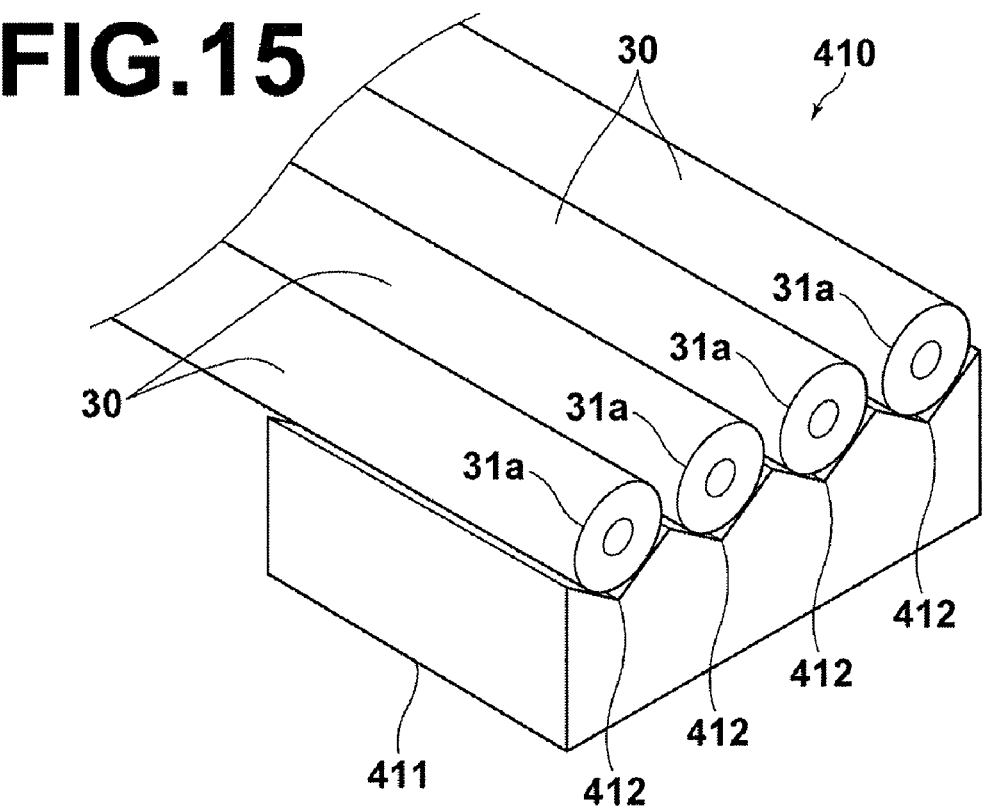
FIG. 15 is a schematic diagram illustrating the structure of an optical fiber array.

As illustrated in FIG. 14, the optical fiber 30 is a multimode optical fiber including a core 32 and a cladding 34. The diameter of the core of the optical fiber 30 is 60 μm, and the outer diameter of the optical fiber is 125 μm. At the output end 31a of the optical fiber 30, a polished end surface 33a of the core is exposed. When light beam B3 that has propagated through the optical fiber 30 is output from the output end 31a of the optical fiber 30, the beam diameter L3 of the light beam B3 at the output end 31a is 60 μm, which is the same as the core diameter of the optical fiber 30. As illustrated in FIG. 15, the output ends 31a of the four optical fibers 30 are fixed into the V-shaped grooves 412 in the substrate 411 having the V-shaped grooves in such a manner that the output ends 31a of the optical fibers 30 are linearly arranged at the ends of the V-shaped grooves 412 of the substrate 411 having the V-shaped grooves. The optical fibers 30 are fixed into respective V-shaped grooves 412 of the substrate 411 having the V-shaped grooves using an ultraviolet setting resin, a thermosetting resin or the like.

Figure 16:
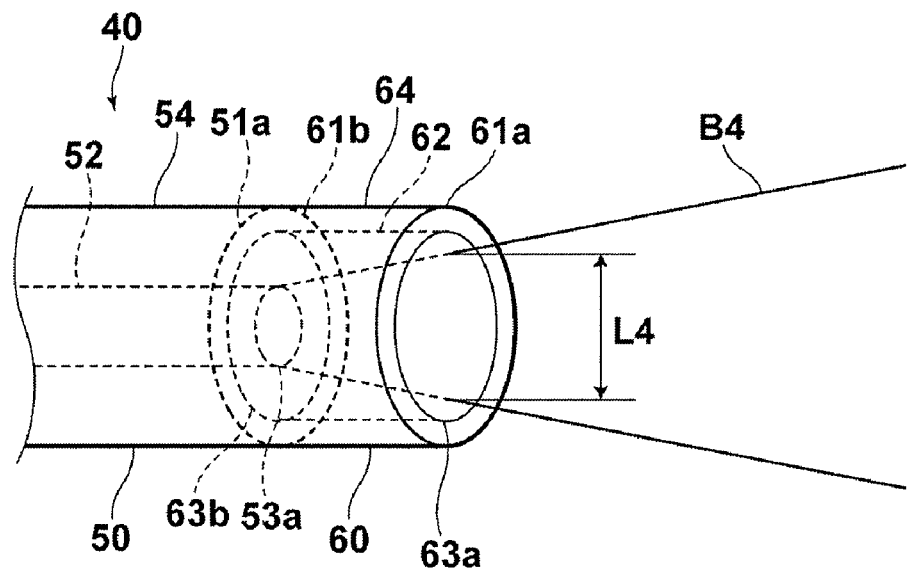
FIG. 16 is a schematic diagram illustrating the structure of an optical fiber.

As illustrated in FIG. 16, the optical fiber 40 includes a main optical fiber 50 and a supplementary optical fiber 60, which is connected to the leading end of the main optical fiber 50. The main optical fiber 50 is a multimode fiber including a core 52 and a cladding 54. The core diameter of the main optical fiber 50 is 60 μm, and the outer diameter of the main optical fiber 50 is 125 μm. The supplementary optical fiber 60 is a multimode fiber including a core 62 and a cladding 64. The core diameter of the supplementary optical fiber 60 is 105 μm, and the outer diameter of the supplementary optical fiber 60 is 125 μm. Further, the length of the supplementary optical fiber 60 is appropriately selected from the lengths in the range of 10 μm to 2 mm. At the output end 61a of the supplementary optical fiber 60, a polished end surface 63a of the core is exposed. Further, the output end 51a of the main optical fiber 50 and the input end 61b of the supplementary optical fiber 60 are connected to each other by fusion splicing.

As illustrated in FIG. 16, light beam B4 that has propagated through the main optical fiber 50 is output from the end surface 53a of the core at the output end 51a of the main optical fiber 50. Further, the output light beam B4 enters the core 62 of the supplementary optical fiber 60. The length of the supplementary optical fiber 60 is short, and the core diameter of the supplementary optical fiber 60 is 125 μm, which is larger than the core diameter (60 μm) of the main optical fiber. Therefore, the light beam B4 that has been output from the main optical fiber 50 is output to the outside of the supplementary optical fiber 60 from the end surface 63a of the core of the supplementary optical fiber 60 without reflecting within the supplementary optical fiber 60. Therefore, the beam diameter L4 of the beam B4 at the output end 61a of the supplementary optical fiber 60 is less than or equal to 105 μm, which is the core diameter of the supplementary optical fiber 60. Specifically, the output end 51a of the main optical fiber 50, which is a connection point between the main optical fiber 50 and the supplementary optical fiber 60, is the light divergent point. The beam diameter L4 of the light beam B4 at the output end 61a can be changed within the range of 60 μm to 105 μm by changing the length of the supplementary optical fiber 60.

Figure 17:
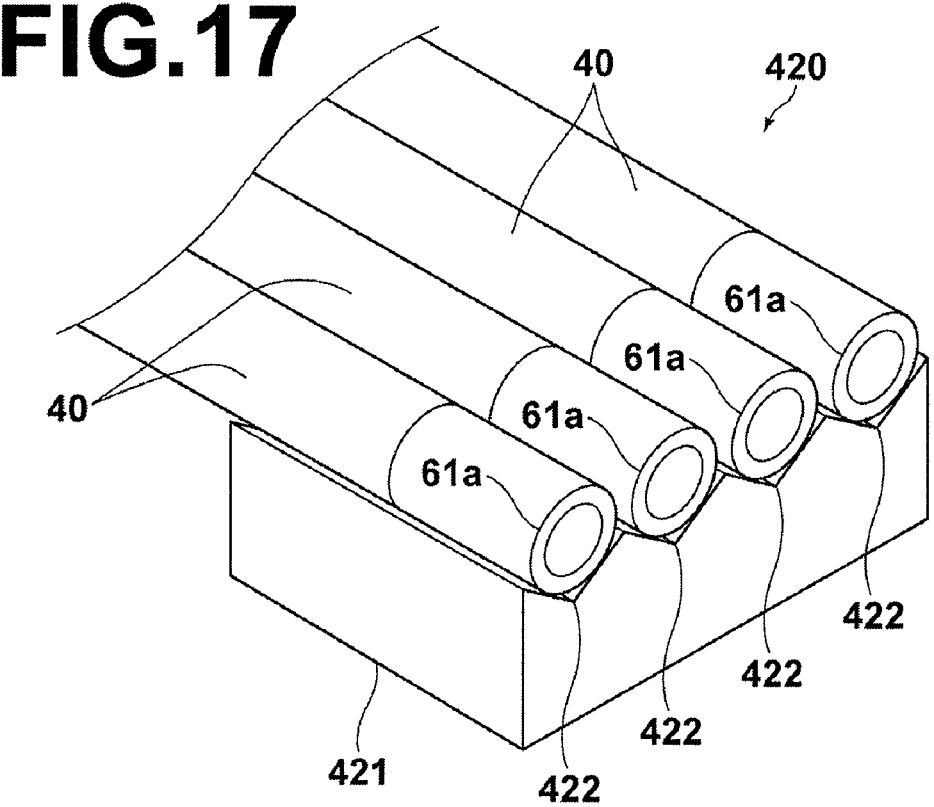
FIG. 17 is a schematic diagram illustrating the structure of an optical fiber array.

Four optical fibers 40 are fixed, as illustrated in FIG. 17, in such a manner that the output ends 61a of the optical fibers 40 are linearly arranged at the ends of the V-shaped grooves 422 of the substrate 421 having the V-shaped grooves. The output ends 61a of the optical fibers 40 are fixed into respective V-shaped grooves 422 of the substrate 421 having the V-shaped grooves using an ultraviolet setting resin, a thermosetting resin or the like.

The optical fiber structure 400 may be used, for example, as an optical head for processing plates for printing with a laser beam in a manner similar to the optical fiber structure 100. The optical fiber structure 400 has advantageous effects similar to those of the optical fiber structure 100. Further, if the optical fiber structure 400 is used, an optical system that is connected to the subsequent stage of the optical fiber structure 400 can be simplified. Further, it is possible to change the condensing positions of the light beam B3 and the light beam B4 using a simple optical system. When processing for different depth positions needs to be performed, for example, in processing of plates for printing with a light beam or the like, an appropriate light beam selected from the light beam B3 and the light beam B4 may be used based on desirable processing conditions.

Figure 18:
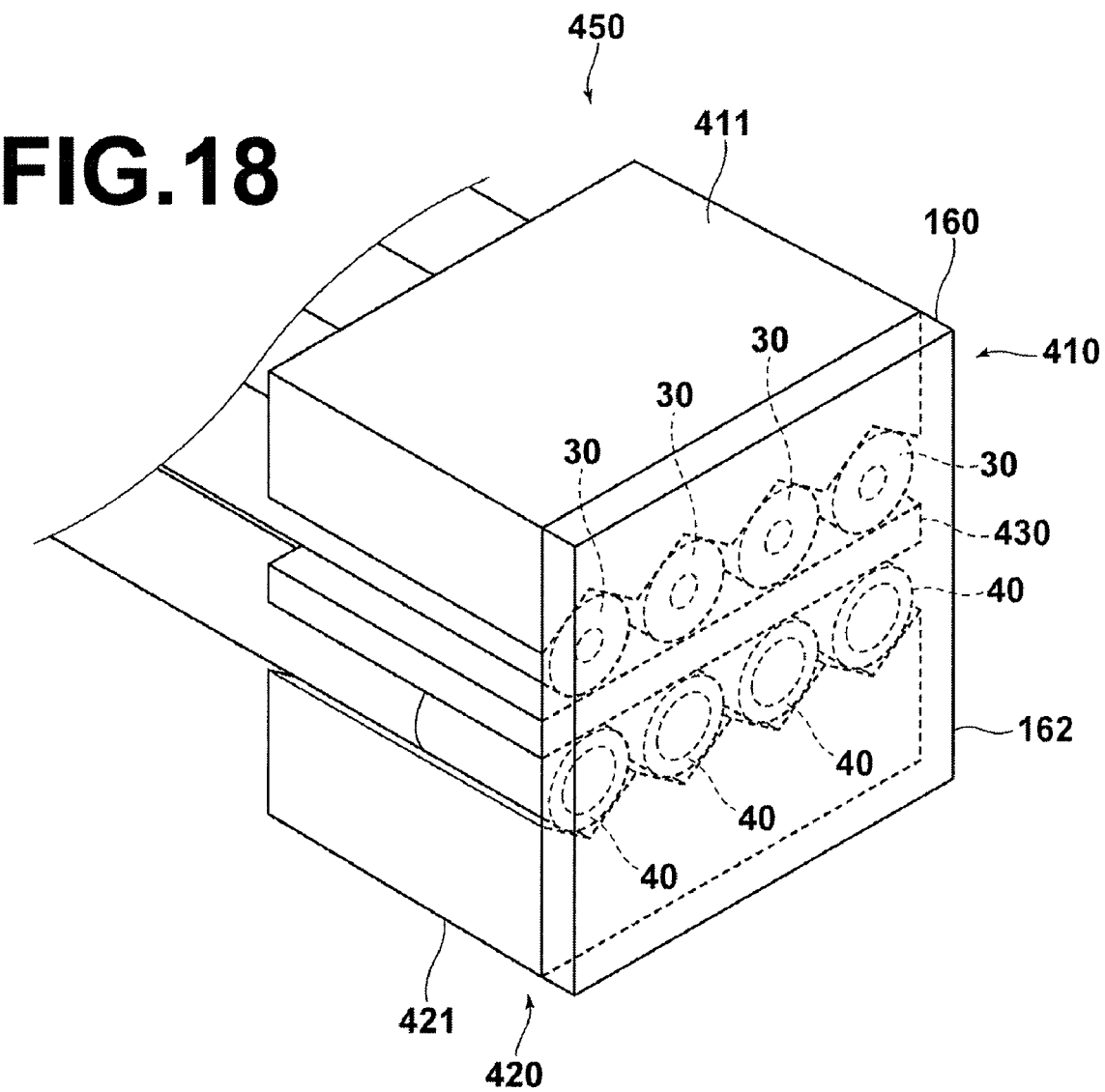
FIG. 18 is a schematic diagram illustrating the structure of an optical fiber structure according to an eighth embodiment of the present invention.

Next, an optical fiber structure 450 according to an eighth embodiment of the present invention will be described with reference to FIG. 18. FIG. 18 is a schematic diagram illustrating the structure of the optical fiber structure 450. In the optical fiber structure 450, the output end of the optical fiber structure 400, illustrated in FIG. 13, is placed in optical contact with the transparent member 160 for protecting the end, illustrated in FIG. 6B. The action and the advantageous effect of the transparent member 160 are substantially similar to those of the transparent member 160 in the optical fiber structure 150, illustrated in FIG. 6B. Therefore, detailed description on the transparent member 160 will be omitted.

Figure 19:
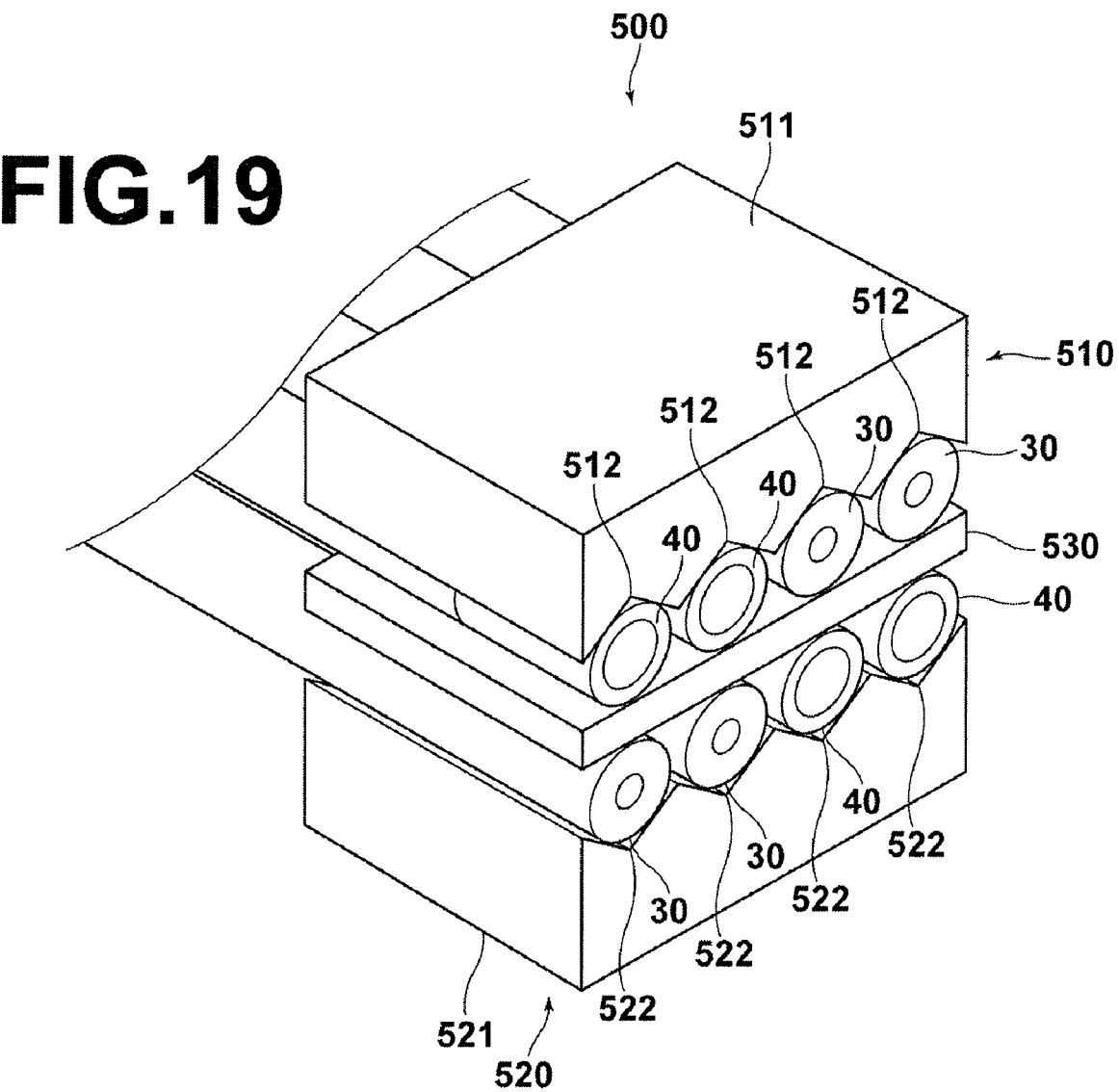
FIG. 19 is a schematic diagram illustrating the structure of an optical fiber structure according to a ninth embodiment of the present invention.

Next, an optical fiber structure according to a ninth embodiment of the present invention will be described. FIG. 19 is a schematic diagram illustrating the structure of an optical fiber structure 500. In FIG. 19, the same reference numerals as those assigned to the corresponding elements in the optical fiber structure 400, illustrated in FIG. 13, will be assigned to the parts and elements of the optical fiber structure 500, and detailed descriptions thereof will be omitted.

As illustrated in FIG. 19, the optical fiber structure 500 includes a first fiber array 510 and a second fiber array 520. The first fiber array 510 includes a substrate 511 having four V-shaped grooves 512. Further, the first fiber array 510 includes two optical fibers 30 and two optical fibers 40, the ends of which are fixed onto the substrate 511 having the V-shaped grooves. The second fiber array 520 includes a substrate 521 having four V-shaped grooves 522. Further, the second fiber array 520 includes two optical fibers 30 and two optical fibers 40, the ends of which are fixed onto the substrate 521 having the V-shaped grooves. Further, the first fiber array 510 and the second fiber array 520 are placed one on the other and fixed. In the first fiber array 510, the order of arrangement of the optical fibers is two optical fibers 40 and two optical fibers 30 from the left side of FIG. 19. Meanwhile, in the second fiber array 520, the order of arrangement of the optical fibers is two optical fibers 30 and two optical fibers 40 from the left side of FIG. 19. In other words, the optical fibers in the first fiber array 510 are arranged in reverse order to the order of arrangement of the optical fibers in the second fiber array 520.

Figure 20:
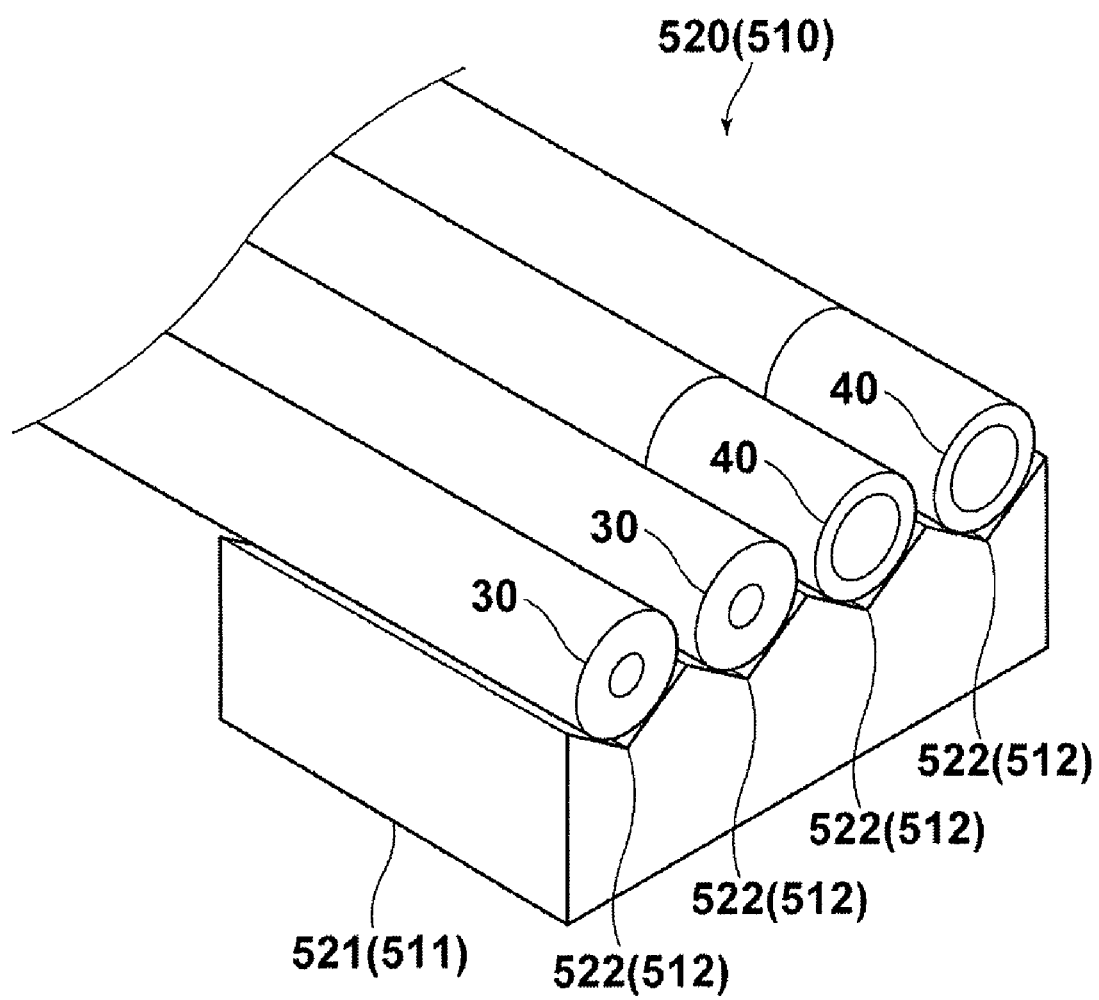
FIG. 20 is a schematic diagram illustrating the structure of an optical fiber array.

As illustrated in FIG. 20, in the second optical fiber array 520, the two optical fibers 30 and the two optical fibers 40 are fixed in such a manner that the output ends of the two optical fibers 30 and the two optical fibers 40 are linearly arranged at the ends of the V-shaped grooves 522 of the substrate 521 having the V-shaped grooves. The optical fibers are fixed into the V-shaped grooves 522, respectively, using an ultraviolet setting resin, a thermosetting resin or the like.

Further, FIG. 20 may be viewed as a diagram in which the first fiber array 510, illustrated in FIG. 19, is placed upside down. In FIG. 20, the two optical fibers 30 and the two optical fibers 40 are fixed into the V-shaped grooves 512 of the substrate 511 having the V-shaped grooves, respectively, using an ultraviolet setting resin, a thermosetting resin or the like. The two optical fibers 30 and the two optical fibers 40 are fixed in such a manner that the output ends of the two optical fibers 30 and the two optical fibers 40 are linearly arranged at the ends of the V-shaped grooves 512 of the substrate 511 having the V-shaped grooves. Specifically, the structure of the first fiber array 510 and that of the second fiber array 520 are the same.

The optical fiber structure 500 may be used, for example, as an optical head for processing plates for printing with a laser beam in a manner similar to the optical fiber structure 400. The optical fiber structure 500 has advantageous effects similar to those of the optical fiber structure 400. Further, the optical fiber structure 500 can be obtained by producing two fiber arrays that have the same structure and by placing the two fiber arrays one on the other. Therefore, the optical fiber structure 500 can be produced easily.

Figure 21:
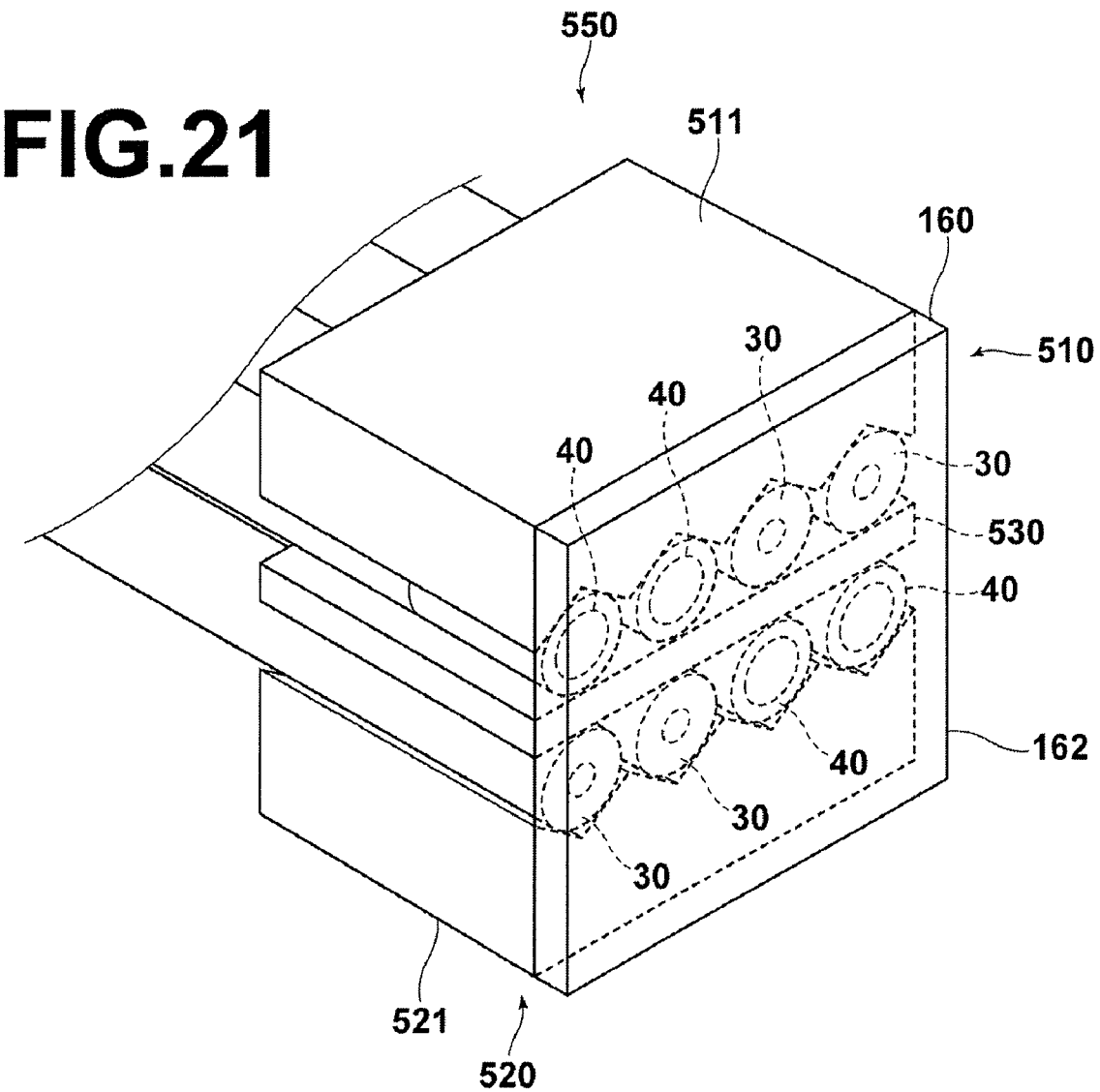
FIG. 21 is a schematic diagram illustrating the structure of an optical fiber structure according a tenth embodiment of the present invention.

Next, an optical fiber structure 550 according to a tenth embodiment of the present invention will be described with reference to FIG. 21. FIG. 21 is a schematic diagram illustrating the structure of the optical fiber structure 550. In the optical fiber structure 550, the output end of the optical fiber structure 500, illustrated in FIG. 19, is placed in optical contact with the transparent member 160 for protecting the end, illustrated in FIG. 6B. The action and the advantageous effect of the transparent member 160 are substantially similar to those of the transparent member 160 in the optical fiber structure 150 illustrated in FIG. 6B. Therefore, detailed description on the transparent member 160 will be omitted.

Figure 22:
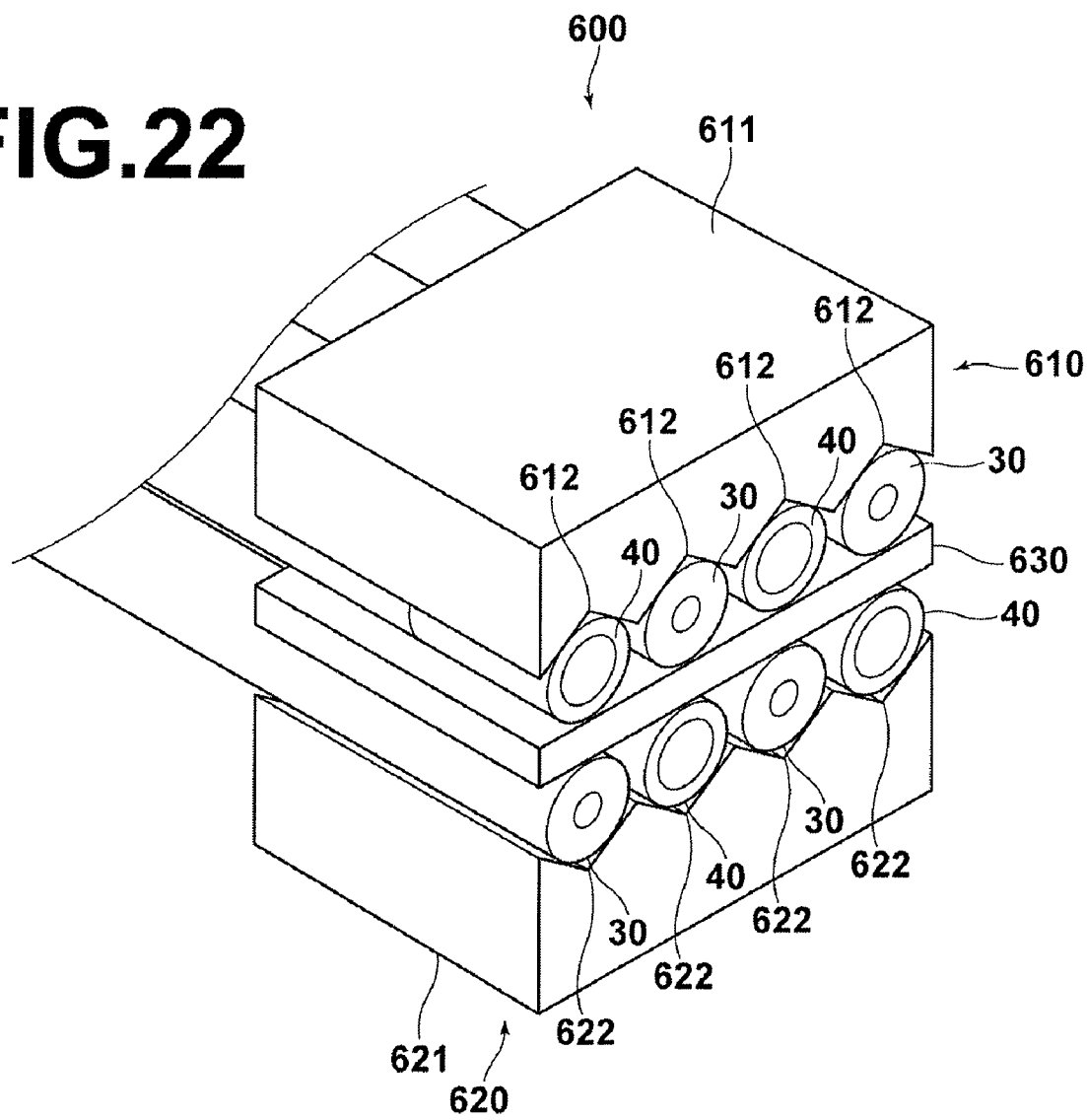
FIG. 22 is a schematic diagram illustrating the structure of an optical fiber structure according an eleventh embodiment of the present invention.

Next, an optical fiber structure according to an eleventh embodiment of the present invention will be described. FIG. 22 is a schematic diagram illustrating the structure of an optical fiber structure 600. In FIG. 22, the same reference numerals as those assigned to the corresponding elements in the optical fiber structure 400, illustrated in FIG. 13, will be assigned to the elements of the optical fiber structure 600, and detailed descriptions thereof will be omitted.

As illustrated in FIG. 22, the optical fiber structure 600 includes a first fiber array 610 and a second fiber array 620. The first fiber array 610 includes a substrate 611 having four V-shaped grooves 612. Further, the first optical fiber array 610 includes two optical fibers 30 and two optical fibers 40, which are alternately arranged, and the ends of which are fixed onto the substrate 611 having the V-shaped grooves. The second fiber array 620 includes a substrate 621 having four V-shaped grooves 622. Further, the second fiber array 620 includes two optical fibers 30 and two optical fibers 40, which are alternately arranged, and the ends of which are fixed onto the substrate 621 having the V-shaped grooves. Further, the first fiber array 610 and the second fiber array 620 are placed one on the other in such a manner that the optical fibers 30 face the optical fibers 40, and fixed. In the first fiber array 610, the order of arrangement of the optical fibers is an optical fiber 40, an optical fiber 30, an optical fiber 40 and an optical fiber 30 from the left side of FIG. 22. Meanwhile, in the second fiber array 620, the order of arrangement of the optical fibers is an optical fiber 30, an optical fiber 40, an optical fiber 30 and an optical fiber 40 from the left side of FIG. 22. In other words, the optical fibers in the first fiber array 610 are arranged in reverse order to the order of arrangement of the optical fibers in the second fiber array 620.

Figure 23:
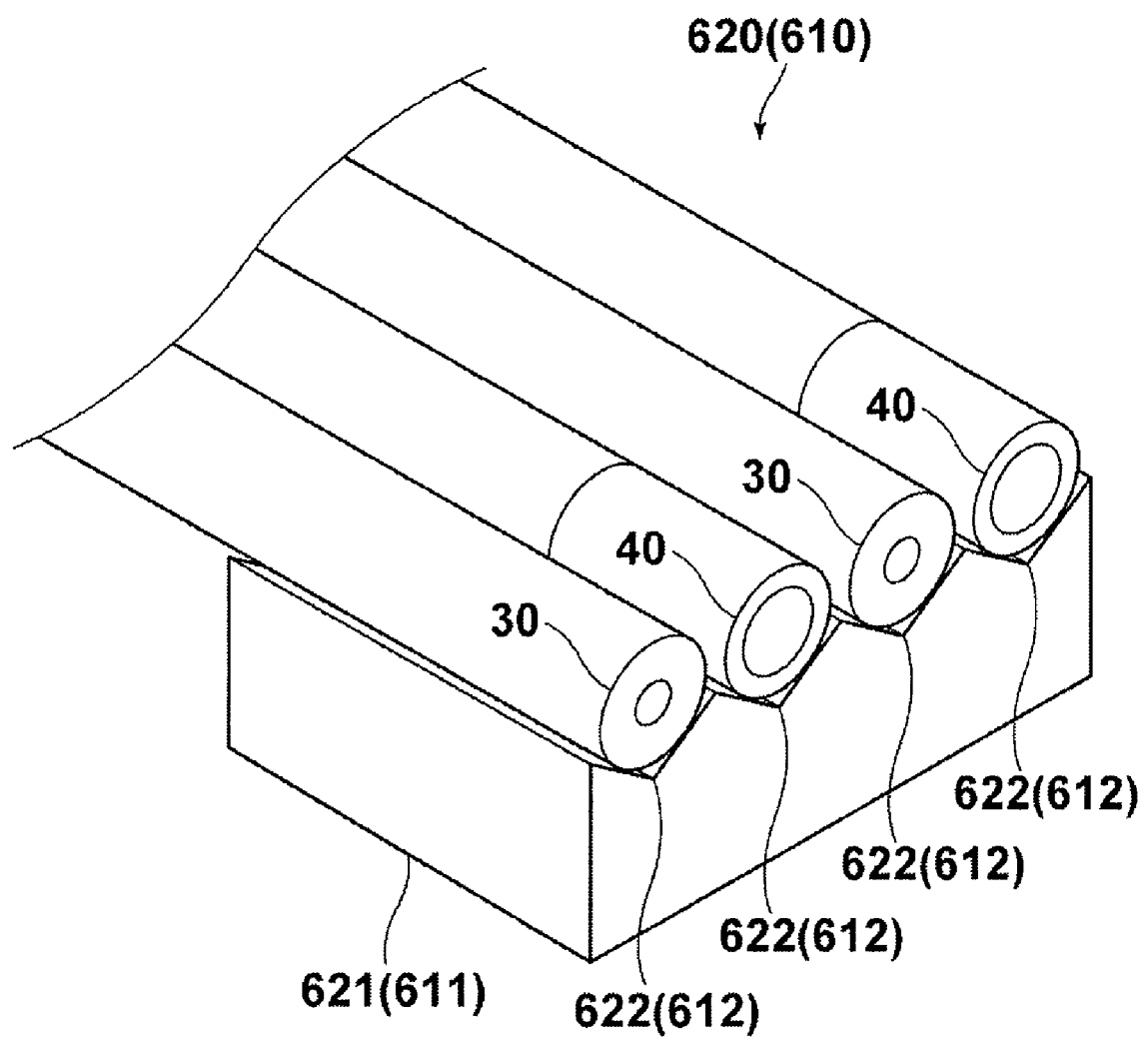
FIG. 23 is a schematic diagram illustrating the structure of an optical fiber array.

As illustrated in FIG. 23, in the second fiber array 620, the two optical fibers 30 and the two optical fibers 40 are fixed in such a manner that the output ends of the two optical fibers 30 and the two optical fibers 40 are linearly arranged at the ends of the V-shaped grooves 622 of the substrate 621 having the V-shaped grooves. The optical fibers are fixed into the V-shaped grooves 622, respectively, using an ultraviolet setting resin, a thermosetting resin or the like.

Further, FIG. 23 may be viewed as a diagram in which the first fiber array 610, illustrated in FIG. 22, is placed upside down. In FIG. 23, the two optical fibers 30 and the two optical fibers 40 are fixed into the V-shaped grooves 612 of the substrate 611 having the V-shaped grooves, respectively, using an ultraviolet setting resin, a thermosetting resin or the like. The two optical fibers 30 and the two optical fibers 40 are fixed in such a manner that the output ends of the two optical fibers 30 and the two optical fibers 40 are linearly arranged at the ends of the V-shaped grooves 612 of the substrate 611 having the V-shaped grooves. Specifically, the structure of the first fiber array 610 and that of the second fiber array 620 are the same.

The optical fiber structure 600 may be used, for example, as an optical head for processing plates for printing with a laser beam in a manner similar to the optical fiber structure 400. The optical fiber structure 600 has advantageous effects similar to those of the optical fiber structure 400. Further, the optical fiber structure 600 can be obtained by producing two fiber arrays that have the same structure and by placing the two fiber arrays one on the other. Therefore, the optical fiber structure 600 can be produced easily. Further, for example, when solid processing is performed, in other words, when the entire area of a certain portion is processed uniformly by using a multiplicity of light beams having large diameters, since a contact area between the optical fibers is small, it is possible to prevent the ends of the optical fibers from being damaged by heat.

In the optical fiber structure 600, the optical fibers 30 and the optical fibers 40 are alternately arranged one by one. Alternatively, when a large number of optical fibers should be arranged, the optical fibers 30 and the optical fibers 40 may be alternately arranged in such a manner that a plurality of optical fibers 30 or 40 are placed together next to each other, for example, two by two or three by three.

Next, an optical fiber structure 650 according to a twelfth embodiment of the present invention will be described with reference to FIG. 24. FIG. 24 is a schematic diagram illustrating the structure of the optical fiber structure 650. In the optical fiber structure 650, the output end of the optical fiber structure 600, illustrated in FIG. 23, is placed in optical contact with the transparent member 160 for protecting the end, illustrated in FIG. 6B. The action and the advantageous effect of the transparent member 160 are substantially similar to those of the transparent member 160 in the optical fiber structure 150 illustrated in FIG. 6B. Therefore, detailed description on the transparent member 160 will be omitted.

In each of the aforementioned embodiments, four optical fibers are arranged in each of the optical fiber arrays. However, the number of the optical fibers is not limited to four. For example, 16, 32 or 64 optical fibers may be arranged in each of the optical fiber arrays.

Further, in the optical fiber structures 300, 400, 500 and 600, when it is not necessary that the optical fibers 10 and 20 or the optical fibers 30 and 40 are aligned in a direction perpendicular to the arrangement direction of each of the optical fiber arrays, the optical fibers 10 and 20 or the optical fibers 30 and 40 may be arranged as closely as possible. Further, in each of the modified examples, a transparent member may be provided at the output end of the light beam.

What is claimed is:

1. An optical fiber structure comprising:
a first optical fiber array including a plurality of optical fibers, the output ends of which are linearly arranged;
a second optical fiber array including a plurality of optical fibers, the output ends of which are linearly arranged; and
a fiber holder for fixing each of the plurality of optical fibers of the first and second optical fiber arrays,
wherein the first optical fiber array and the second optical fiber array are placed one on the other, and wherein the optical fibers in the first optical fiber array and the second optical fiber array include at least one first optical fiber that outputs a light beam having a first beam diameter from the output end thereof and at least one second optical fiber that outputs a light beam having a second beam diameter from the output end thereof, and wherein the first beam diameter and the second beam diameter are different from each other;
wherein the core diameter of the first optical fibers at the output ends thereof is different from the core diameter of the second optical fibers at the output ends thereof,
wherein the core diameter of the second optical fibers at the output ends thereof is greater than the core diameter of the first optical fibers at the output ends thereof, and
wherein the second optical fibers have light divergent points on the insides of the output ends of the second optical fibers.

2. An optical fiber structure, as defined in claim 1, wherein the first optical fiber array includes a plurality of first optical fibers arranged therein, and wherein the second optical fiber array includes a plurality of second optical fibers arranged therein.

3. An optical fiber structure, as defined in claim 1, wherein each of the first optical fiber array and the second optical fiber array includes at least one first optical fiber and at least one second optical fiber arranged therein, and wherein each of the first optical fibers and the second optical fibers is arranged in such a manner that the arrangement in the second optical fiber array is in reverse order to the order of arrangement in the first optical fiber array.

4. An optical fiber structure, as defined in claim 3, wherein the first optical fiber array includes the at least one first optical fiber arranged in a half of the first optical fiber array and the at least one second optical fiber arranged in the other half of the first optical fiber array, and wherein the second optical fiber array includes the at least one second optical fiber arranged in a half of the second optical fiber array and the at least one first optical fiber arranged in the other half of the second optical fiber array.

5. An optical fiber structure, as defined in claim 3, wherein the at least one first optical fiber and the at least one second optical fiber in the first optical fiber array are alternately arranged one by one, and wherein the at least one second optical fiber and the at least one first optical fiber in the second optical fiber array are alternately arranged one by one.

6. An optical fiber structure, as defined in claim 2, wherein the first optical fiber arranged in the first optical fiber array and the second optical fiber arranged in the second optical fiber array face each other, and the second optical fiber arranged in the first optical fiber array and the first optical fiber arranged in the second optical fiber array face each other.

7. An optical fiber structure, as defined in claim 1, wherein the second optical fiber includes a main optical fiber that has a core having a predetermined core diameter and a supplementary optical fiber that has a core having a core diameter that is greater than that of the main optical fiber, and the main optical fiber and the supplementary optical fiber are connected to each other, and wherein the light divergent point of the second optical fiber is located at a connection point between the main optical fiber and the supplementary optical fiber.

8. An optical fiber structure, as defined in claim 7, wherein the core diameter of the main optical fiber is the same as the core diameter of the first optical fiber, and wherein the angle of divergence of light output from the first optical fiber is the same as the angle of divergence of light output from the second optical fiber.

9. An optical fiber structure as defined in claim 1, wherein the fiber holder comprises a first substrate having a plurality of grooves for fixing the plurality of optical fibers of the first optical fiber array by setting each fiber in each groove, and a second substrate having a plurality of grooves for fixing the plurality of optical fibers of the second optical fiber array by setting each fiber in each groove.

10. An optical fiber structure as defined in claim 9, wherein the plurality of grooves are V-shaped.

* * * * *